United States Patent
Yoshizawa et al.

(10) Patent No.: US 10,201,753 B2
(45) Date of Patent: Feb. 12, 2019

(54) GAMING MACHINE AND PROGRAM THEREOF

(75) Inventors: Kazumasa Yoshizawa, Tokyo (JP); Junichi Kogo, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 1432 days.

(21) Appl. No.: 11/176,597

(22) Filed: Jul. 8, 2005

(65) Prior Publication Data

US 2006/0030384 A1    Feb. 9, 2006

(30) Foreign Application Priority Data

Jul. 16, 2004   (JP) .................. 2004-210580
Jul. 16, 2004   (JP) .................. 2004-210581

(51) Int. Cl.
*G09G 5/02* (2006.01)
*A63F 13/426* (2014.01)
*G07F 17/32* (2006.01)
*H04N 21/436* (2011.01)
*H04N 21/478* (2011.01)

(52) U.S. Cl.
CPC ........ *A63F 13/426* (2014.09); *G07F 17/3209* (2013.01); *G07F 17/3211* (2013.01); *H04N 21/43615* (2013.01); *H04N 21/4781* (2013.01); *A63F 2300/1075* (2013.01)

(58) Field of Classification Search
CPC ............ G07F 17/3211; G07F 17/3213; G07F 17/3202; G07F 17/34; G07F 17/3216; G07F 17/3209; G07F 17/3262; G07F 17/3269; A63F 13/2145; A63F 2300/1068; A63F 2300/1075; A63F 2300/8029; A63F 2300/807; G06F 3/04883; G06F 2203/04808; G06F 3/0488
USPC ......................................... 463/25, 30, 36–37
See application file for complete search history.

(56) References Cited

U.S. PATENT DOCUMENTS 5,404,458 A * 4/1995 Zetts ............................. 710/73
5,594,810 A * 1/1997 Gourdol ...................... 382/187
5,655,136 A * 8/1997 Morgan ....................... 382/187

(Continued)

FOREIGN PATENT DOCUMENTS

GB    2 147 817 A    5/1985
JP    2000-250710    9/2000

(Continued)

OTHER PUBLICATIONS

Craig Harris, "E3 2004: The Nintendo DS: Revealed", May 11, 2004, IGN, paragraph [0003], <http://gameboy.ign.com/articles/513/513188p1.html>.*

(Continued)

*Primary Examiner* — Justin Myhr
(74) *Attorney, Agent, or Firm* — Lex IP Meister, PLLC

(57) ABSTRACT

A gaming machine of the present invention operates such that when a plurality of positions are inputted, positional information is generated based on the plurality of positions and sign information, indicative of a sign passing across the plurality of positions, is generated based on the positional information upon which comparison is made between sign information, indicative of the signs passing across the plurality of positions, and preliminarily stored sign data to discriminate a correlation between the sign information and the sign data.

23 Claims, 26 Drawing Sheets

(56) References Cited

U.S. PATENT DOCUMENTS

| | | |
|---|---|---|
| 2002/0018051 A1 | 2/2002 | Singh |
| 2002/0022509 A1* | 2/2002 | Nicastro et al. ............... 463/15 |
| 2002/0090993 A1* | 7/2002 | Koshiro ................ G06T 17/00 463/30 |
| 2002/0141643 A1* | 10/2002 | Jaeger ................ G06F 3/0481 382/181 |
| 2003/0214536 A1* | 11/2003 | Jarrett ................ G06F 3/0481 715/831 |
| 2005/0179648 A1* | 8/2005 | Barabe et al. ............... 345/156 |
| 2005/0208993 A1* | 9/2005 | Yoshizawa et al. ............ 463/20 |
| 2005/0270289 A1* | 12/2005 | Momose ............ G06F 3/04883 345/443 |

FOREIGN PATENT DOCUMENTS

| | | |
|---|---|---|
| JP | 2001-507148 | 5/2001 |
| JP | 2002-000939 | 1/2002 |

OTHER PUBLICATIONS

Craig Harris, "E3 2004: Hands-on: Bomberman DS", May 11, 2004, IGN, paragraph [0004], <http://ds.ign.com/articles/513/513161p1.html>.*

Craig Harris, "E3 2004: Hands-on: Metroid Prime: Hunters", May 11, 2004, IGN, paragraph [0002], <http://ds.ign.com/articles/513/513153p1.html>.*

Craig Harris, "E3 2004: Hands-on: Pac 'n Roll", May 11, 2004, IGN, paragraph [0003]-[0004], <http://ds.ign.com/articles/513/513160p1.html>.*

European Search Report dated Nov. 21, 2005.

* cited by examiner

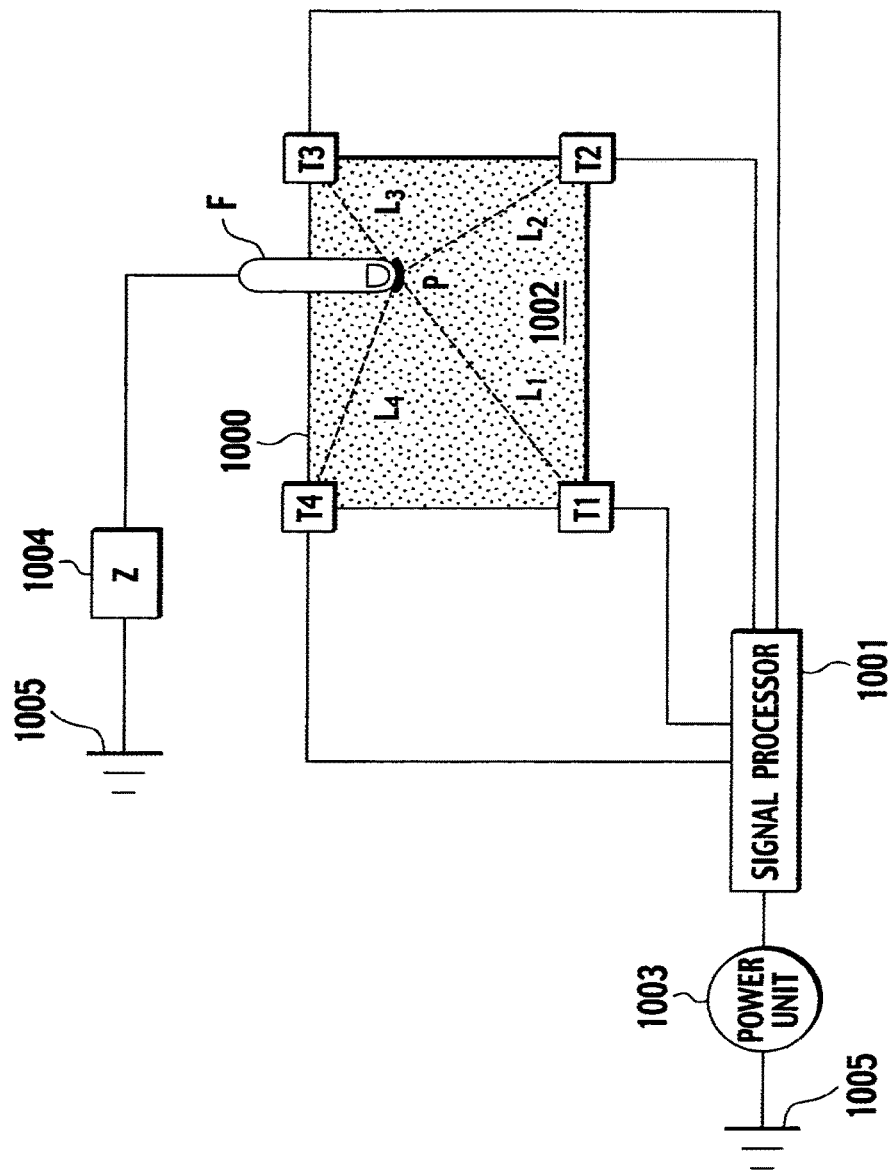

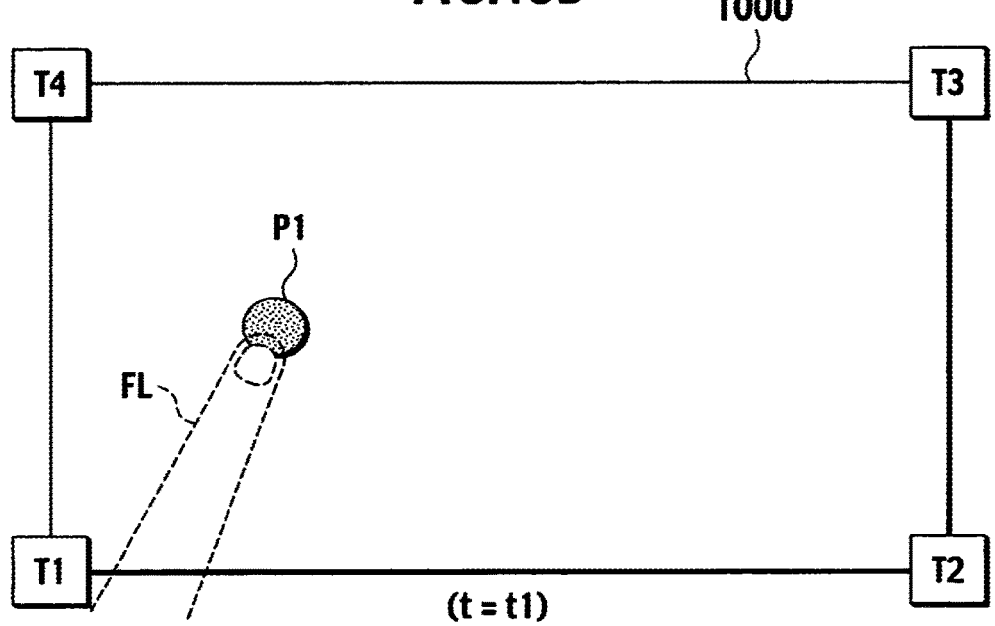
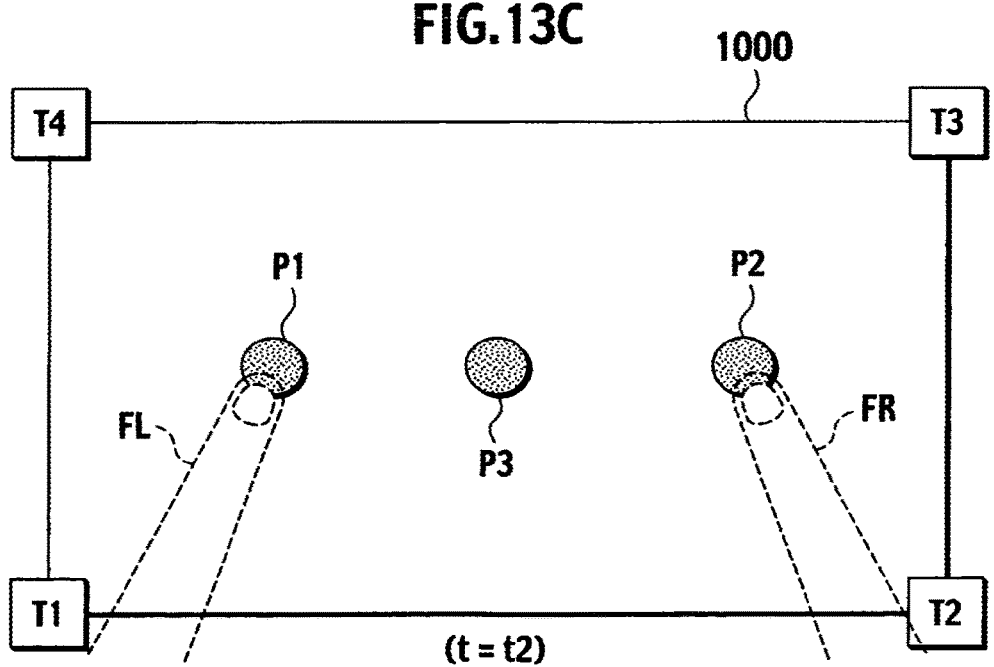

FIG.21A
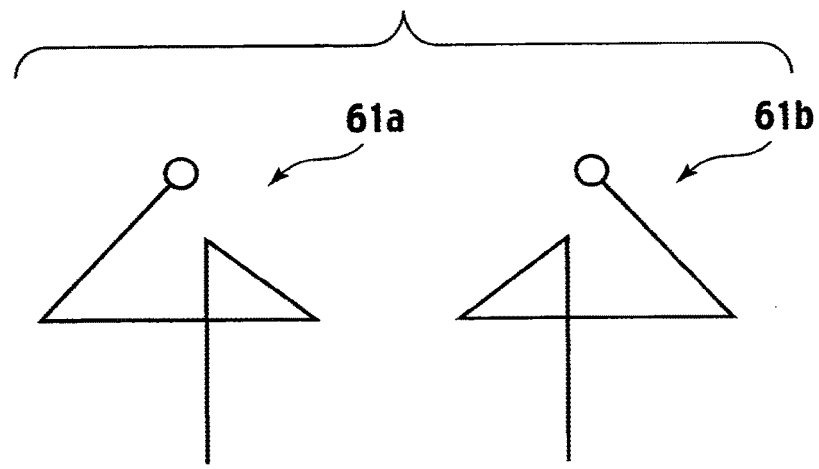
FIG.21B
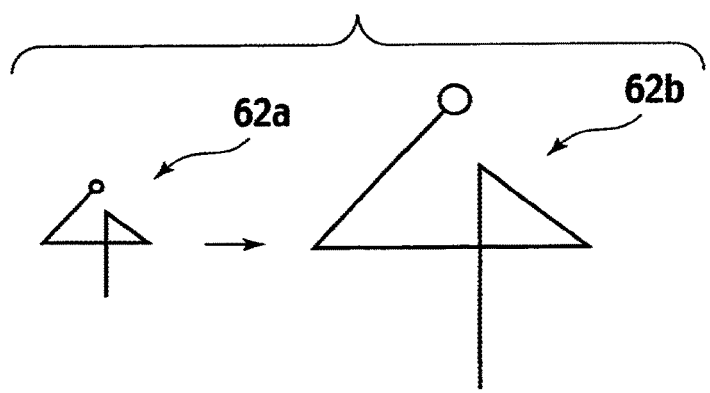
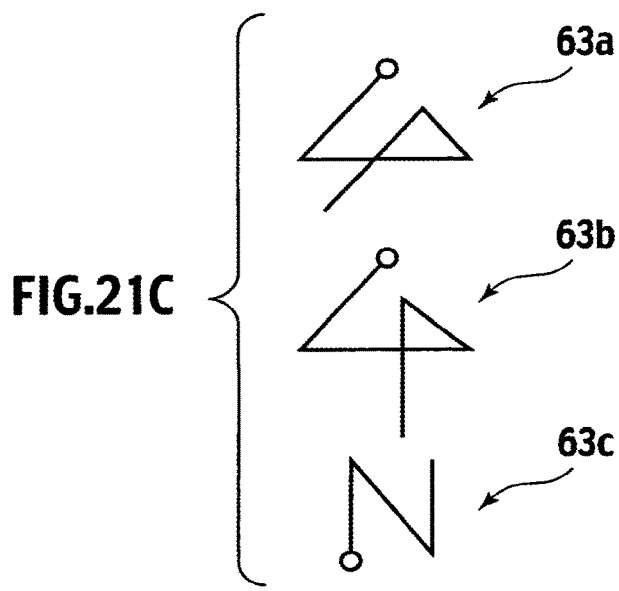
FIG.21C

○ : TAP-START POINT
□ : TAP-END POINT
✕ : INTERMEDIATE POINT

GAMING MACHINE AND PROGRAM THEREOF

CROSS REFERENCE TO RELATED APPLICATIONS

This application is based upon and claims the benefit of priority from the prior Japanese Patent Applications No. 2004-210580, filed on Jul. 16, 2004; No. 2004-210581, filed on Jul. 16, 2004; the entire contents of which are incorporated herein by reference.

BACKGROUND OF THE INVENTION

1. Field of the Invention

The present invention relates to gaming machines and, more particularly, a gaming machine and related programs wherein input operations per se has gaming characteristics.

2. Description of the Related Art

In recent years, research and development work has heretofore been undertaken to provide gaming machines, such as slot machines and computer-games for home use/arcade game use. These gaming machines, which are widely used in general practice, include a controller, composed of various buttons, which is programmed such that when a player operates the controller, characters on a display device achieve desired operations.

Further, another gaming machine has been developed which has a display device configured to allow a player to directly touch the display device and a detected player touched position whereby enabling various operations to be performed depending on the touched position (as disclosed, for instance, in Japanese Patent Application Laid-Open Publication No. 2002-939 (on paragraphs [0054] to [0061] and in FIGS. 7 to 12).

With the gaming machine set forth above, a contact sensor, such as a touch panel, is attached onto a front surface of the screen. Such a contact sensor detects a position, at which the player has touched.

Examples of a contact position detection system with such a touch panel include an electrostatic capacity type method, which measures electric potentials at electrodes located at four corners of a touch panel (as disclosed, for instance, in Japanese Patent Application Laid-Open Publication No. 2001-507148), and an electrostatic capacitory coupling method that measures a flow rate of electric current at the four corners of the touch panel (as disclosed, for instance, in Japanese Patent Application Laid-Open Publication No. 2000-250710).

However, with the gaming machines set forth above, the operations to be executed upon manipulations of the player to directly touch the screen are made for the games to be progressed. Thus, no remarkable difference exists with respect to input operations activated by a normally used keyboard and game pad and the input operations per se have no gaming characteristic.

Further, the related art gaming machine is configured to allow the inputting on the touch panel such that one input like an input conducted by one hand of the player is allocated to one reaction and one process to cause restriction in variations in the input with the touch panel, resulting in limitation in an attempt to allow the input per se to have an interesting and entertaining capabilities.

BRIEF SUMMARY OF THE INVENTION

The present invention has been completed with the above view in mind and has an objective to provide a gaming machine and programs in which input operations per se, to be executed by a player per se, have gaming capabilities for thereby allowing a game to have an entertaining and exciting value.

Another object of the present invention is to provide a gaming machine and programs in which input operations per se, to be executed by a player per se, have gaming capabilities while the input operations can be performed in a comfortable manner.

To achieve the above objects, a gaming machine comprising: an input device available to accept an input, indicating a position, activated by a player; a positional information certifying device operative to output positional information based on the input accepted by the input device; a sign information generating unit operative to generate sign information based on the positional information outputted from the positional information certifying unit; a sign data storage device that stores sign data correlated with a predetermined gaming process; a comparing and discriminating unit operative to make comparison between the sign information, certified by the sign information generating unit, and the sign data, stored in the sign data storage device, and discriminating whether or not the sign information and the sign data are correlated with each other; and a gaming processing unit operative to execute a gaming process correlated with the sign data, under a condition where the comparing and discriminating unit discriminates that the sign information and the sign data are correlated with each other; wherein the positional information certifying unit is operative such that when a plurality of positions are inputted to the input device, input information depending on the plurality of positions is generated; and the sign information generating unit is operative to generate sign information, indicative of signs passing across the plurality of positions, based on positional information depending on the plurality of positions.

With such a structure, an action of the player, for instance, to directly input to draw the sign forms the input operation. With the player inputting the sign, the gaming machine crosschecks the sign, detected based on the inputted sign, and the preliminary stored sign data, correlated with the predetermined gaming process, upon which when crosschecked in success, the gaming process associated with such sign data is executed. Therefore, since the gaming process is executed depending on the sign inputted on the screen by the player, variations in input increase and a need arises for the player to have skills in input operations, causing a game to have a dramatically improved entertaining and exciting value.

Further, since the gaming machine generates the positional information based on the plurality of positions whereby the sign information generating unit generates the sign information indicative of the sign passing across the plural positions, inputting several points on the sign completes the inputting of the sign without a need for a whole of the sign to be inputted.

With the gaming machine of the presently filed embodiment, since permitting the input device to drawn the sign enables the gaming process associated with the sign to be executed, the input operations per se have the gaming capabilities while allowing the inputting of the sign, activated by inputting the plurality of positions, to be treated as the input operations. Additionally, it becomes possible to provide a game in which the input operations per se are caused to have the gaming capabilities and, even when the sign should be inputted by moving the finger for a long distance, only touching several points on the sign enables the inputting of the sign to be completed, enabling the realization of the inputting for a short time interval in a comfortable manner.

Also, the gaming machine of the present invention may be configured such that the sign data storage unit stores the sign data correlated with the at least one gaming process, respectively, and the comparing and discriminating unit selects the sign data correlated with the sign information.

With such a structure, the plural sign data and the plural gaming processes are correlated to allow a unique gaming process to be practiced depending on the sign drawn by the player. This makes it possible to vary the gaming processes in accordance with the sign drawn by the player, resulting in further improved gaming capabilities of the input operations directly performed on the screen by the player.

The gaming machine of the present invention may be configured in a structure that further includes a display device (display section) configured to show information related to the sign information.

With such a structure, the player is enabled to perform the inputting while confirming the sign, certified by the gaming machine, shown on the screen of the display device.

Further, the gaming machine of the present invention may be configured in a structure wherein the input unit includes a transparent touch panel on the display device and the display device shows the plural inputs, by which the sign is to be inputted, based on the sign data.

Such a structure forms the gaming machine that shows for each sign to be drawn by the player for providing a guideline for the player to perform the inputting. Therefore, even when the player is not proficient in the use of the gaming machine, the player is enabled to easily enjoy the gaming through a plurality of inputs.

The gaming machine of the present invention may be configured in a structure wherein when the plurality of positions is concurrently inputted to the input device, the positional information certifying unit outputs the positional information indicative of one position composed of the medium point, the center point or the gravity center point.

With such a structure, even when more than two inputs are concurrently activated, that is two points of the display deveice are touched by the player, the input device outputs the medium point, the center point or the gravity center at the plurality of inputted positions, making it possible to execute the gaming process without an increase in an operating load of a CPU.

The program of the present invention is a program operable by a computers comprising the steps of: preliminarily storing sign data correlated with a gaming process; generating positional information corresponding to a position that is inputted; generating sign information based on the positional information; making comparison between the sign information and the sign data and discriminating whether or not the sign information and the sign data are correlated with each other; allowing a computer to execute a gaming process, related to the sign data, when discrimination is made that the sign information and the sign data are correlated with each other; wherein when a plurality of positions are inputted, the step of generating the positional information generates positional information based on the plurality of positions; the step of generating the sign information generates sign information, indicative of signs, passing across a plurality of positions; and the step of discriminating makes comparison between the sign information, indicative of the signs passing across the plurality of positions, and the sign data, which is preliminarily stored, for thereby discriminating a correlation between the sign information and the sign data.

With the program of the presently filed embodiment, by directly inputting several points on the sign makes it possible to complete the input operations in which the sign is drawn.

Further, with the program of the presently filed embodiment, permitting the input device to drawn the predetermined sign allows the gaming process associated with the sign to be executed. This enables the input operations per se to have gaming capabilities and it becomes possible to treat the inputting of the sign, activated by inputting the plural positions, as the input operations. Thus, even when the sign needs to be inputted by shifting a finger for a long distance, touching the sign at several points allows the inputting of the sign to be completed, enabling the realization of the inputting for a short time interval in a comfortable manner.

Furthermore, the program may take the form that further includes a display step that, in cases where a plurality of positions are inputted, provides a display related to the sign information based on one positional information generated in the step of generating the positional information.

With the program having such a characteristic, it becomes possible for the player to perform the inputting while confirming the sign, certified by the gaming machine, on the display device.

Moreover, the display step of the program may be configured to adopt a structure wherein when the plurality of positions is inputted, the sign passing across the plural positions are displayed based on the sign data.

Such a program forms a gaming machine that displays the sign to be drawn by the player for providing a guideline for the player to perform the inputting. Therefore, even when the player is not proficient in the use of the gaming machine, the player is enabled to easily enjoy the game upon executing a plurality of inputs.

Furthermore, the program may be configured in a structure wherein in cases where the plurality of positions is concurrently inputted, the step of generating the positional information allows the positional information to be outputted as one position representing the medium point, the center point or the center gravity point of the plural positions.

Such a program makes it possible for the gaming process to be executed without increasing the operating load of the CPU even when more than two inputs are concurrently activated.

BRIEF DESCRIPTION OF THE SEVERAL VIEWS OF THE DRAWINGS

FIGS. 3A to 3C are views for illustrating operations of the gaming machine of the first embodiment according to the present invention, wherein FIGS. 3A and 3B show basic operations; and FIG. 3C shows a special operation.

FIG. 11 is a block diagram showing a structural example of an input device.

FIG. 13B is a view showing an example, appearing subsequent to a step shown in FIG. 13A, in which touching the sensor panel with the left and right fingers allows the sign to be inputted.

FIG. 13C is a view showing an example, appearing subsequent to a step shown in FIG. 13B, in which touching the sensor panel with the left and right fingers allows the sign to be inputted.

FIGS. 21A to 21C are views for illustrating comparison and discrimination for the magic-circle certificate process in the gaming machine of the first embodiment according to the present invention.

DETAILED DESCRIPTION OF THE INVENTION

First Embodiment

Hereunder, embodiments according to the present invention are described in detail with reference to the accompanying drawings. The presently filed embodiments are described below in connection with exemplary cases wherein the present invention is applied to an arcade gaming machine.

Figure 1:
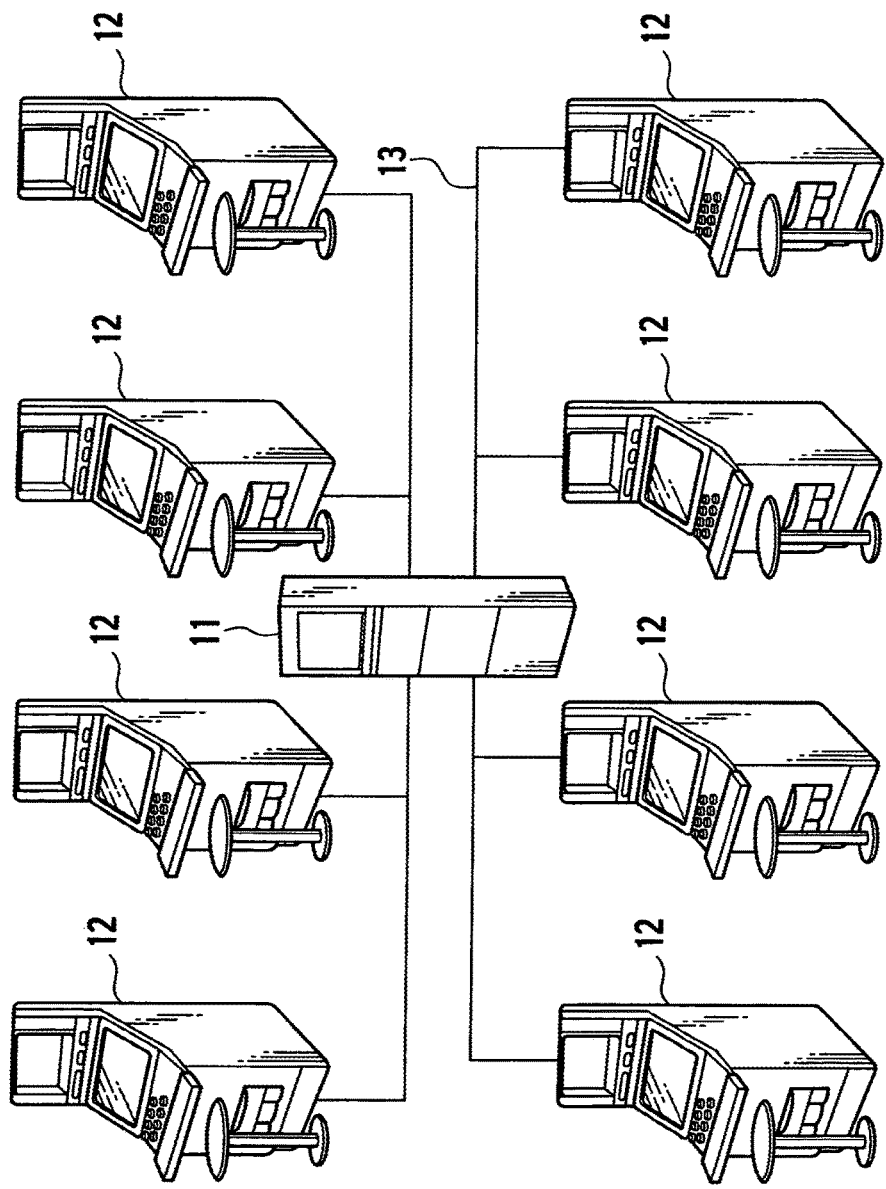
FIG. 1 is a schematic view illustrating a role playing game system including a gaming machine of a first embodiment according to the present invention.

Referring to FIG. 1, a role-playing game system of the present invention is mainly comprised of a host computer 11, and a plurality of gaming machines 12 connected to the host computer 11 via communication lines 13 such as the Internet and a LAN network. The role-playing game system is described below with reference to FIG. 1 wherein eight gaming machines 12 are connected to the host computer 11. The number of gaming machines 12, to be connected to the host computer 11, is not particularly limited. The role-playing game system with such a structure enables a large number of players to simultaneously participate in play of a role-playing game (hereinafter referred to as RPG).

Figure 2:
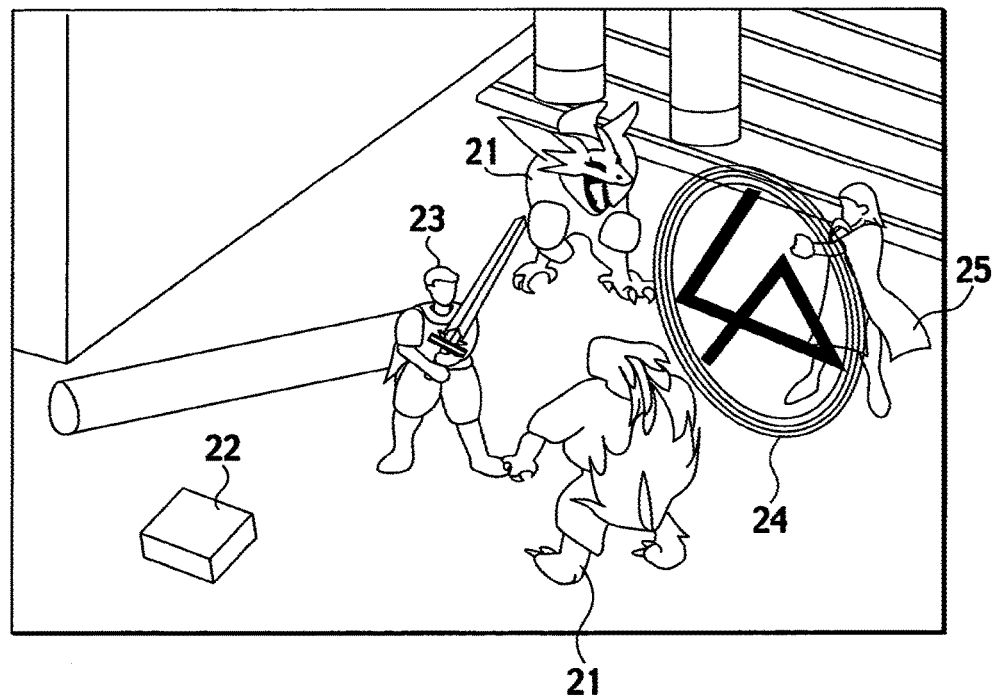
FIG. 2 is a view illustrating one executed screenshot of a role playing game available to be executed in the gaming machine of the first embodiment according to the present invention.

Referring to FIG. 2, the RPG shows a self-character (avatar) 23 controlled by a player, enemy-characters (such as monsters) 21 that obstruct the proceeding of the self-character 23, a non-player-character 25 simultaneously operated by the other player on the same location in a virtual space structured by the RPG system; that is, on the same display device as that on which the self-character 23 is displayed, and various items 22 such as arms, armors and medicines to be used by the characters 23, 25 during the game proceeding. Meanwhile, examples of the character 25 may include a fellow-character that progresses the game in association with the self-character 23. Also, the RPG of the presently filed embodiment is configured to allow the drawing of a predetermined magic-circle (sign), such as a pentagram, star or other shape, 24 on a display device for thereby carrying out special gaming processes like making a magic attack to the enemy-characters (monsters) 21.

Figure 3A:
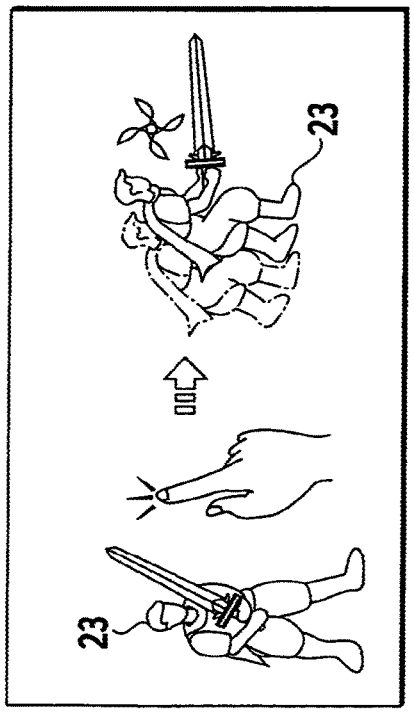
Figure 3B:
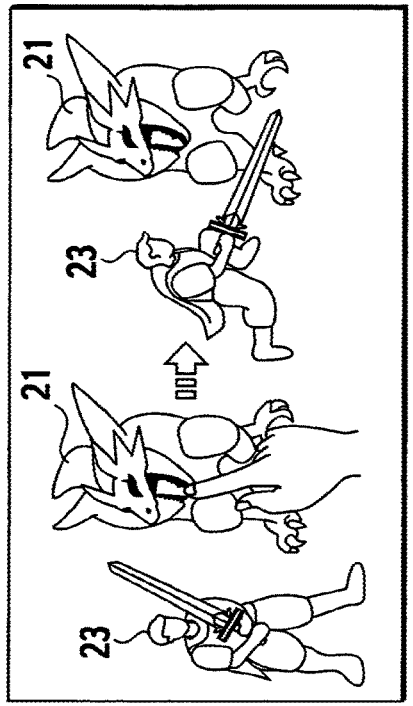
Figure 3C:
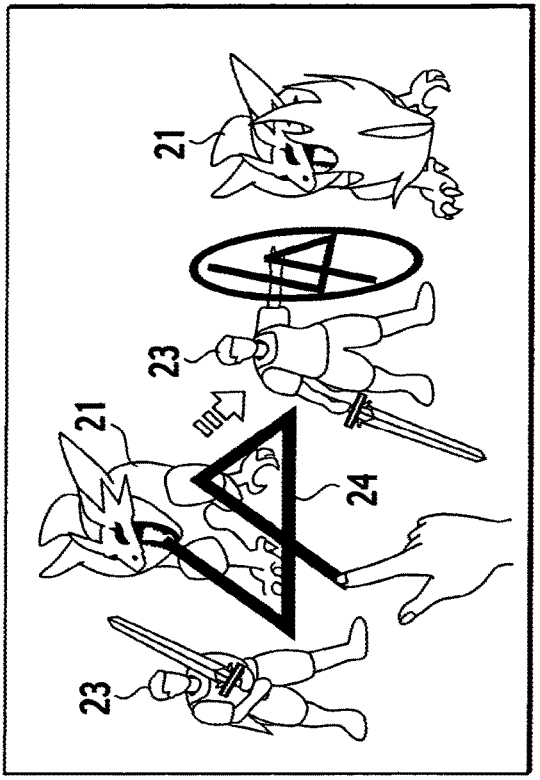

Operations in the RPG include basic operations, shown in FIGS. 3A and 3B, and special operations shown in FIG. 3C. More specifically, the basic operations include a basic movement, shown in FIG. 3A, and a basic attack (non-magic attack) shown in FIG. 3B. For the operation to execute the movement, the player taps on the display device in the vicinity of the self-character 23 at a side to which the self-character 23 is desired to move as shown in FIG. 3A. When this takes place, the self-character 23 moves in a desired direction on a route as short as possible. In order to execute the operation for the basic attack to be activated, the enemy 21, displayed on the display device, is tapped as shown in FIG. 3B. In this moment, the self-character 23 moves a suitable position to attack the enemy 21 with a sword or bow.

Examples of the special operations may include a magic attack as shown in FIG. 3C. The magic attack is practiced upon drawing or tracing a predetermined magic-circle 24 on the vicinity of the enemy 21 displayed over the display device. This allows the self-character 23 to defeat the enemy 21 using magic. In such a case, magic effects are configured to vary depending on a size of and drawing location of the magic-circle (sign) and a timing at which the magic-circle (sign) 24 is drawn or traced on the display device. Also, a concrete gaming process will be described below.

Figure 4:
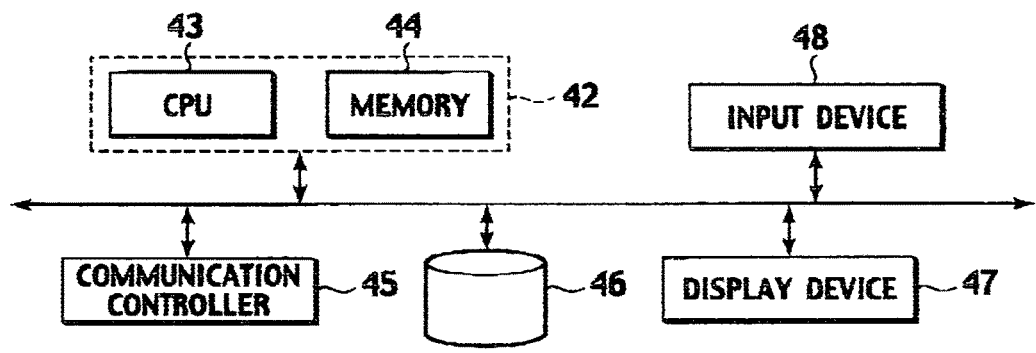
FIG. 4 is a block diagram illustrating a schematic structure of the gaming machine of the first embodiment according to the present invention.

As shown in FIG. 4, the gaming machine 12 is mainly comprised of a processing unit 42 that allows the execution of a variety of gaming processes, a communication controller 45 that achieves communication control between the host computer 11 and the associated gaming machines 12 via the communication lines 13, a storage device (a memory device, such as a Hard Drive Disk (HDD), a RAM or a storage medium read-out device) 46 that stores programs of the RPG; a display device (display means) 47 which includes a screen and shows various images of the RPG on the screen thereof, and an input device (input means) 48 through which inputs are activated to perform operations.

The processing unit 42 includes a CPU 43 that controls the gaming processes, and a memory 44 that temporally or permanently stores a variety of data. The CPU 43 serves as component parts such as a positional information acquiring unit, a sign-certifying unit, a comparing and discriminating unit and a gaming processing unit. Also, the memory 44 and/or the storage device 46 serve as a component part such as a sign data storage device.

The processing unit 42 is configured to execute a variety of gaming processes. Examples of the gaming processes may include steps of executing the basic movement and attack, displaying menus, making shortcuts, picking up items and touching milestones or the like. It is to be noted that these gaming processes are considered to be of illustrative examples only and may be suitably altered depending on a kind of the RPG.

Figure 5A:
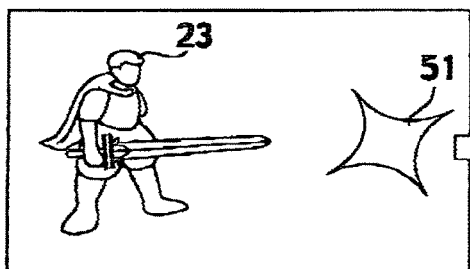
FIGS. 5A and 5B are views for illustrating various gaming processes in the gaming machine according to the present invention.
Figure 5B:
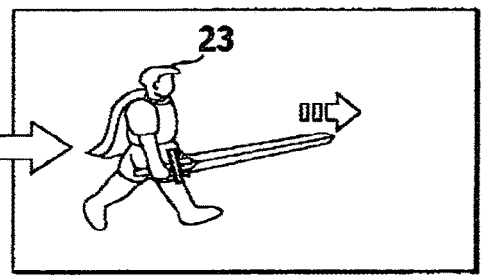

The basic movement is executed by making a single tapping on the display device 47 at a position toward which the self-character 23 is moved (with a tap-con 51 being displayed) as shown in FIG. 5A, then allows the self-character 23 moves toward the relevant position as shown in FIG. 5B. In this case, even if an impedimenta (not shown) is present on a route between the position, at which the self-character 23 is currently present, and another position to which the self-character 23 is moved during the basic movement of the self-character 23, the self-character 25 automatically avoids the impedimenta and moves toward a targeted position through the shortest distance.

Figure 6A:
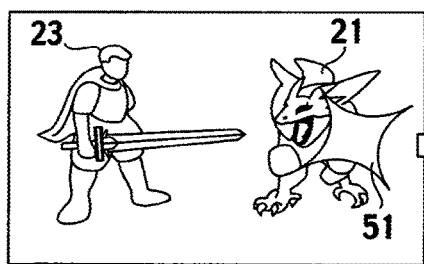
FIGS. 6A and 6B are views for illustrating various gaming processes in the gaming machine of the first embodiment according to the present invention.
Figure 6B:
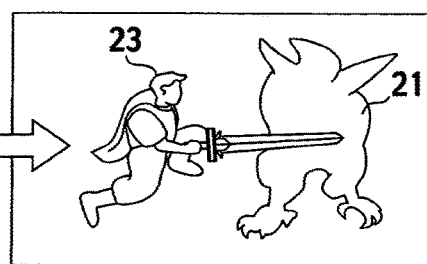

The attack is activated by making a single tapping on an attack object (i.e. the enemy monster 21) on the display device 47 (with the tap icon 51 being displayed) as shown in FIG. 6A. When this takes place, the self-character 23 moves to a position in a distance optimum for attacking the tapped-object 21 (such as the enemy monster and generator), thereby making the attack on the object 21 as shown in FIG. 6B.

Figure 7A:
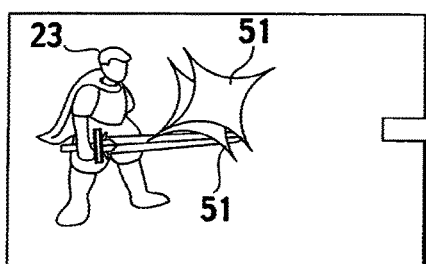
FIGS. 7A and 7B are views for illustrating various gaming processes in the gaming machine of the first embodiment according to the present invention.
Figure 7B:
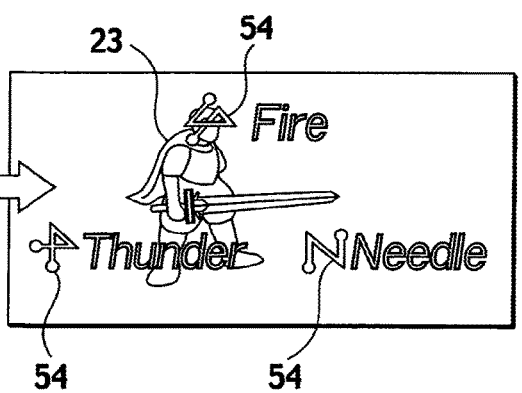

The menu is displayed by making double tapping on the screen of the display device 47 at an arbitrary position thereof in two consecutive times (with the two lap icons 51, 51 are displayed in an overlapped one another) as shown in FIG. 7A. With such operations, a selectable menu 54 (a list of available magic, in the drawing figure, which the self-character 23 can make use) is displayed as shown in FIG. 7B.

Figure 8A:
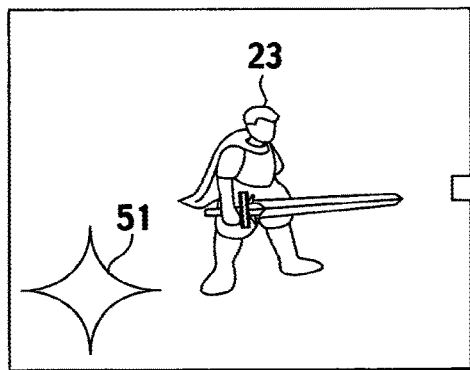
FIGS. 8A and 8B are views for illustrating various gaming processes in the gaming machine of the first embodiment according to the present invention.
Figure 8B:
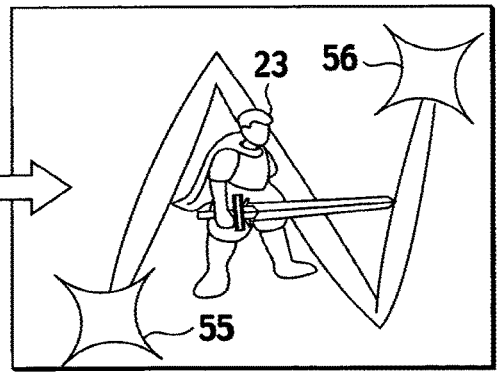

The shortcutting (special operation set forth above) is activated upon tracing the screen of the display device 47 so as to draw a predetermined magic-circle (sign) as shown in FIGS. 8A and 8B. For instance, as shown in FIG. 8B, tracing the screen of the display device 47 in a pattern from a tap-start point 55 to a tap-end point 56 allows a predetermined magic attack to be activated. Although such a magic attack can also be selected from the displayed menu, tracing the screen of the display device 47 allows the shortcutting to be made for activating the magic attack, thereby enabling the magic attack to be quickly activated. Activating the magic attack in short order in such a way makes it possible to activate the magic attack without disturbing the progress of the RPG. A detailed process on such a special operation will be described below.

Figure 9A:
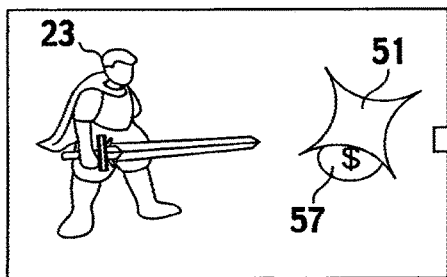
FIGS. 9A and 9B are views for illustrating various gaming processes in the gaming machine of the first embodiment according to the present invention.
Figure 9B:
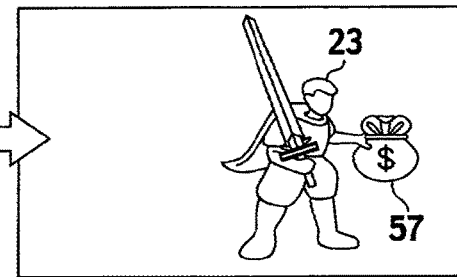

The item-picking-up operation is executed by making a tapping on an item 57 under a stage in a displayed state (with the tap icon 51 being displayed) as shown in FIG. 9A. Such operation causes the self-character 23 to move toward the item 57 to allow the item 57 to be picked up. Thus, as shown in FIG. 9B, such operation raises a class (i.e., a level of the self-character 23). Also, examples of the item 57 may include a mana (money in the game), arms and armors.

Figure 10A:
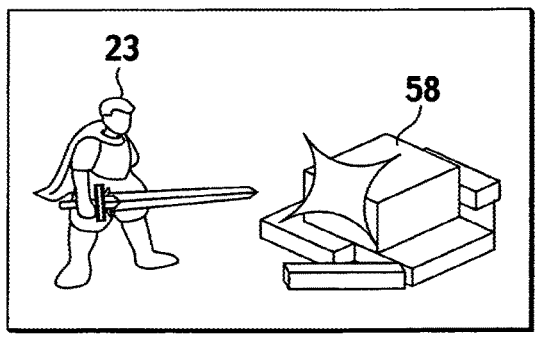
FIGS. 10A and 10B are views for illustrating various gaming processes in the gaming machine of the first embodiment according to the present invention.
Figure 10B:
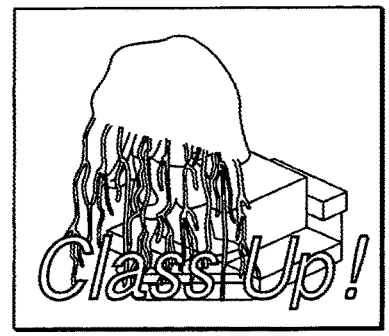

The operation for touching the milestone is practiced by making a tapping on an object, which is referred to as a milestone, (with the tap-icon 51 being displayed) as shown in FIG. 10A. This operation is executed first by picking up and collecting mana dropped in a map displayed on the screen of the display device 47. Thus, with the milestone 58 being tapped, the self-character 23 comes close to the milestone 58 to automatically obtain the mana. This enables the self-character 23 to be classed up as shown in FIG. 10B. Depending on a kind of the collected manas, parameters of the gaming process are classed up.

In FIG. 4, the communication controller 45 transmits the gaming process in the RPG to the host computer 11, via the communication line 13, to which the gaming process is transmitted from the other gaming machine 12 on which the RPG is practiced. The gaming processes, delivered from the other gaming machines 12, are displayed together with the own gaming process shown on the screen of the display device 47. This enables a player to play a game on the RPG together with the other players.

The input device 48, serving as the input means, may include an input device of any structure, provided that the player is enabled to input a sign, such as a touch panel, a mouse, a track ball, a digitizer and a motion capture or the like. Particularly, by using a contact type input means, such as a transparent touch panel disposed on a display device of a liquid crystal display panel device, which is available for the player to directly touch the display device for operation, it becomes possible for the player to further simply execute the special operation, that is, an operation to draw the sign, desired by the player, by simply tracing the same with a finger of the player.

The input device, set forth above, may be preferably configured to have a characteristic of recognizing two signs, simultaneously inputted by the player, as one sign or a function to perform such recognizing operation.

Many probabilities exist for recently available touch panel sensors to be of an electric capacitance type and a touch panel sensor of such a type has a hardware characteristic that outputs a medium (gravity center) position among a plurality of input positions in response to a plurality of concurrently activated inputs. Such a hardware characteristic is derived from a fact that a contact area is formed in a surface area, sized to some extent, even in the presence of a fingertip of the player brought into contact with the touch panel sensor and, hence, a certain one position is outputted in connection with such an area. Such a hardware characteristic is also provided in the other touch panel sensors of the type, different from the electric capacitance type, such as an electrostatic capacitory coupling type and a resistance film type.

Hereunder, there is shown an example of the input device 48 that has the above-described hardware characteristic wherein when a player concurrently inputs two signs, this two signs are certified as one sign.

FIG. 11 is a block diagram showing a structural example of the input device 48 using a contact type touch panel. A sensor panel 1000 has a layer (in a resistance film) of a surface resistance element 1002, composed of resistance material, uniformly formed over a surface of resin or glass plate serving as a base and electrodes T1, T2, T3, T4 are located at four corners of the resistance film upon which an input voltage is applied to these electrodes. A signal processor 1001 measures current values, flowing through the electrodes T1, T2, T3, T4, or differential voltage potentials thereof and, based on resulting measured values, a contact position P of a finger (or conductive object) F on the surface of the sensor panel 1000 is calculated.

The surface resistance element 1002 has a surface with no insulation layer formed thereon to allow the finger F to be brought into direct electric contact with the surface resistance element 1002. The signal processor 1001 is supplied with electric power from an AC signal generator (not shown) to which a power unit 1003 is connected.

Now, description is made of a basic sequence of operations to be executed when detecting a contact position (on coordinates X, Y) P at which the finger F is brought into contact with the sensor panel 1000. The AC signal generator (not shown) generates sequential pulses with a predetermined Sine wave that are supplied to the sensor panel 1000. The finger F is brought into direct contact with the surface of the uniformly distributed surface resistance element 1002. A human body is a conductive body with a resistance in the order of several kΩ to 10kΩ and this resistor is shown in an equivalent resistor 1004.

The AC signal for detecting a coordinates has a current loop as described below. That is, the current loop is established through the AC signal generator (not shown), the signal processor 1001, the electrodes T1 to T4, the uniform surface resistance element 1002, the finger F, the equivalent resistor 1004, the ground 1005 and the power unit 1001 and current returns to the AC generator.

The surface resistance element 1002 has a uniformly resistance-valued distribution and AC signal currents i1, i2, i3, i4, flowing from the electrodes T1 to T4 to the finger F, vary in inverse proportion to distances L1, L2, L3, L4 between the contact point P and the electrodes T1 to T4, whereby it is conceived that the closer to the contact point P, the larger current flows through the electrodes T1, T2, T3, T4. For instance, with a structure shown in FIG. 11, the distance L3 is shortest and the current flowing through the electrode T3 has the maximum current value. Thus, this results in a capability of calculating the contact point P (on the coordinates X, Y) of the finger F on the sensor panel 1000 based on percentages of the AC signal current values i1 to i4, flowing through the four electrodes, which are measured by the signal processor 1001.

With a technology disclosed in Japanese Patent Application Laid-Open Publication No. 2000-250710, the percentages of the AC signal current values flowing through the four electrodes connected to the signal processor 1001 allow the calculation formulae, by which the contact point (on the coordinates X, Y) of the finger F on the sensor panel 1000, to be normalized as Eqs. (1), (2).

$$X=(iB+iC-iA-iD)/(iA+iB+iC+iD) \quad (1)$$

$$Y=(iC+iD-iA-iB)/(iA+iB+iC+iD) \quad (2)$$

Now, description is made of a basic sequence of operations of the input device 48 to be executed when two contact points are concurrently inputted to the input device 48 by the player.

Figure 12:
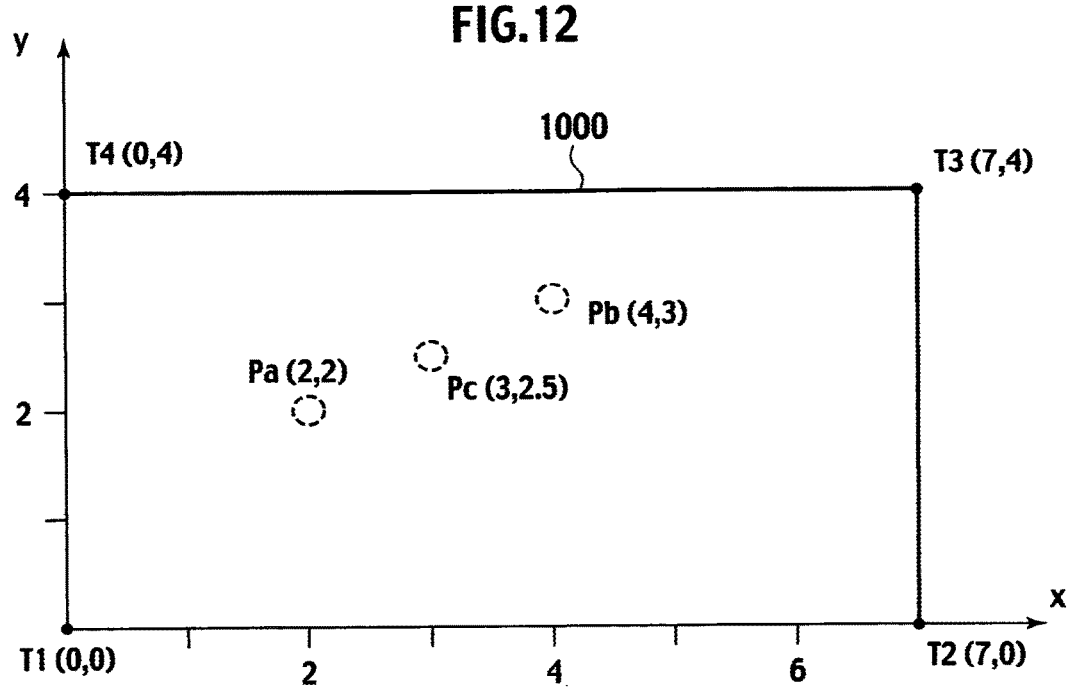
FIG. 12 is a view for illustrating a position to be certified when two contact points appear on a surface of the input device.

FIG. 12 shows a case wherein the finger F of the player touches the surface of the sensor panel 1000 at different contact points Pa, Pb. The electrodes T1, T2, 13, T4 are located at the four corners of the sensor panel 1000. With such an example shown in FIG. 12, the contact points Pa, Pb have the coordinates (2, 2), (4, 3), respectively, with their origin at a center of T1.

It is conceived that current values, flowing from the electrodes T1, T2, T3, T4 to the contact points Pa, Pb, depend on resistance values between respective one of the electrodes T1, T2, T3, T4 and the contact points Pa, Pb and the resistance values vary in proportion to distances between the respective one of the electrodes T1, T2, T3, T4 and the contact points Pa, Pb due to the uniform surface resistance element 1002.

In cases where the contact points Pa, Pb are concurrently present on the sensor panel 1000, the flow rates of currents flowing through the electrodes T1, T4 depend on currents flowing between these electrodes and the contact point Pa, closer to these electrodes, and are less susceptible with currents flowing between these electrodes and the contact point Pb. On the contrary, the flow rates of currents flowing through the electrodes T2, T3 depend on currents flowing between these electrodes and the contact point Pb and are less susceptible with currents flowing between these electrodes and the contact point Pa.

With the signal processor 1001, since the flow rates of currents flowing through the electrodes T1, T4 represent a position of the contact point Pa and, in contrast, the flow rates of currents flowing through the electrodes T2, T3 represent a position of the contact point Pb, a single position cannot be specified and, therefore, a point Pc (3, 2.5) midway between the contact points Pa, Pb is outputted as a position of the contact point.

Thus, in cases where the two contact points are concurrently present on the sensor panel 1000, the input device 48 does not output the positions of the respective contact points but outputs the position midway between these two positions.

Due to such an operating characteristic of the input device 48 by which the two contact points are certified as one contact point at the point midway between these two contact points in a manner set forth above, in cases where the player concurrently inputs the two signs on the input device 48, the input device 48 outputs positional information as representing a single sign drawn at the medium point between the two inputted signs.

With the gaming machine 12 of the presently filed embodiment, inputting a plurality of positions makes it possible to allow a sign to be inputted to the input device 48. Hereunder, description is made of a method of inputting a sign upon inputting a plurality of positions.

FIGS. 13A to 13D are views showing examples in each of which a sign is inputted upon action of a player with left and right fingers to touch the sensor panel 1000, serving as the input device 48, at times t0, t1, t2, t3 (earliest at time t0 and latest at time t3), respectively. FIG. 13E is a view showing a sign certified by the gaming machine 12 under a situation where the input operations, shown in FIGS. 13A to 13D, are performed.

Figure 13A:
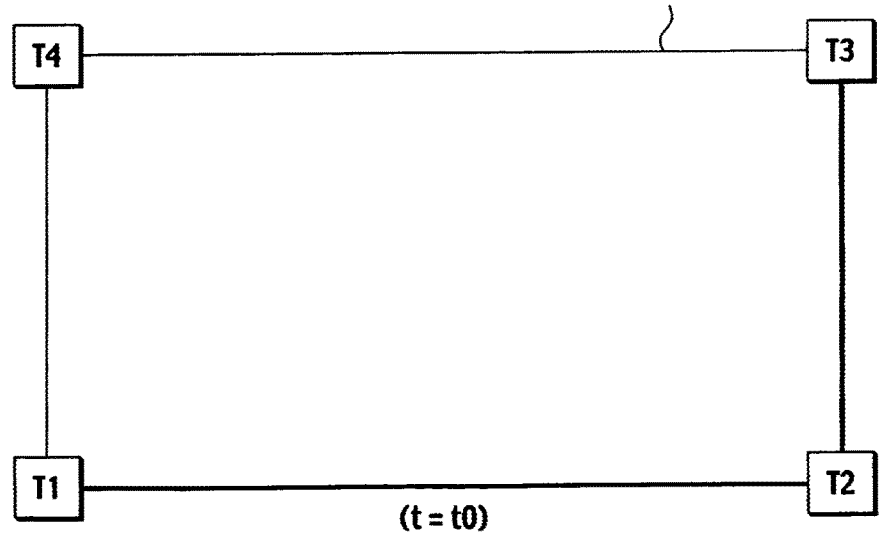
FIG. 13A is a view showing an example in which touching a sensor panel with left and right fingers allows a sign to be inputted.

First, at time t=t0, a condition stands before the player begins to input positions and, as shown in FIG. 13A, none of the left and right fingers is brought into touch with the sensor panel 1000.

Next, at time t=t1, the player begins to activate inputting a position. That is, the player move his left finger FL so that the left finger FL touches with the surface of the sensor panel 1000, activating the positional input. FIG. 13B shows the sensor panel 1000 at time t=t1 and it is supposed that a contact point associated with the left finger FL is located at a position P1. When this takes place, the signal processor 1001 of the input device 48 outputs a coordinates of the position P1.

Subsequently, at time t=t2, with the left finger FL held in touch with the surface of the sensor panel 1000 at the position P1, the player moves his right finger FR so that right finger FR touches with the surface of the sensor panel 1000 at a position P2. FIG. 13C shows an appearance of the sensor panel 1000 representing how the inputs are activated at time t=t2. As mentioned above, when the two different contact points are present on the sensor panel 1000, the signal processor 1001 of the input device 48 outputs a position P3 at a point midway between the positions P1, P2.

Figure 13D:
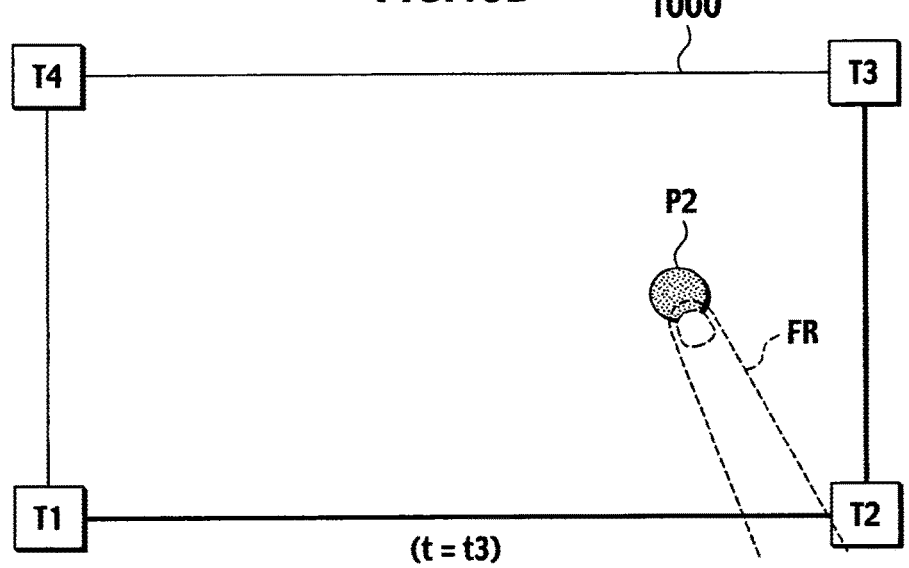
FIG. 13D is a view showing an example, appearing subsequent to a step shown in FIG. 13C, in which touching the sensor panel with the left and right fingers allows the sign to be inputted.
Figure 13E:
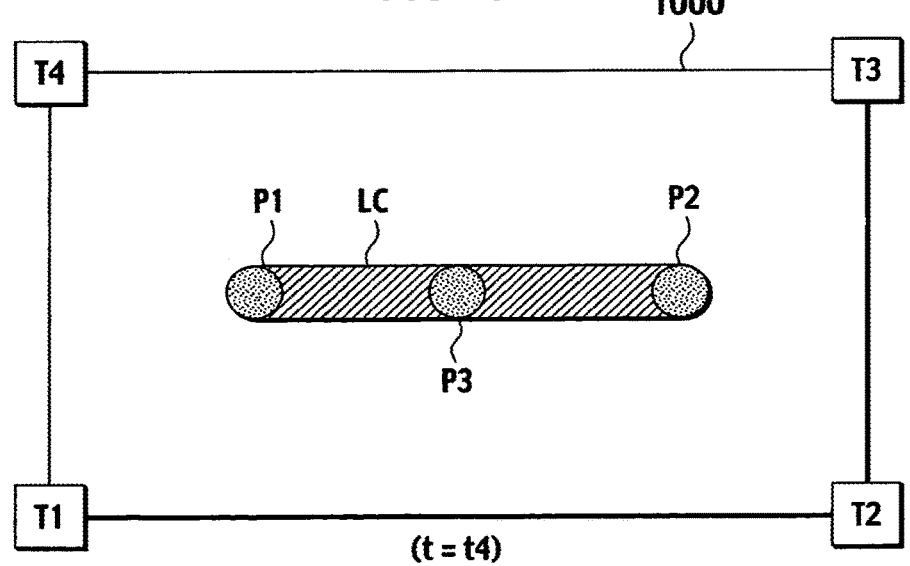
FIG. 13E is a view showing a sign certified by the gaming machine when input operations, shown in FIGS. 13A to 13D, are performed.

Next, at time t=t3, the player has the left finger FL to took off from the surface of the sensor panel 1000 whereas the right finger FR remains in touch with the surface of the sensor panel 1000 at the position P2. FIG. 13D shows an appearance of the sensor panel 1000 representing how the inputs are activated at time t=t3. At time t=t3, the signal processor 1001 of the input device 48 calculates a coordinates of the position P2.

Lastly, in subsequent step (t=t4) after a status appearing at time t=t3, the player releases his right finger FR from the surface of the sensor panel 1000. When this takes place, the signal processor 1001 outputs data, indicative of the absence of the input, or no data is outputted.

The positions, which the signal processor 1001 detects at times t=t0 to t=t4, respectively, are outputted in an order of the positions P1, P3, P2. This allows the gaming machine 12 to recognize that a sign LC (FIG. 13E) is inputted which starts at the position P1 to terminate at the position P2 via the position P3. That is, in place of the player's operations for any of the fingers to activate the inputs by tracing the surface of the sensor panel 1001 at the positions P1, P3, P2, touching the positions P1, P2 with the left and right fingers enables the sign LC to be inputted.

With such an inputting method, even if the sign is long in distance, merely touching the sign at several points (for example, P1, P2) thereof causes the inputting of the sign to be completed, making it possible to shorten a time interval needed for inputting.

Figure 14:
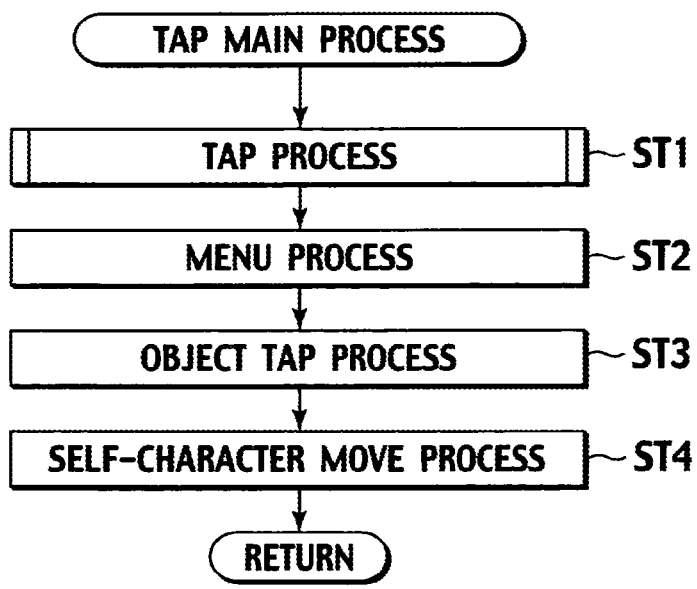
FIG. 14 is a flowchart for illustrating a tapping main process in the gaming machine of the first embodiment according to the present invention.

Now, a gaming process, to be practiced in the gaming machine with such a structure, is described further in detail. FIG. 14 is a flowchart for illustrating a basic sequence of a tapping main process to be executed for the gaming process of the gaming machine according to the present invention. Also, description is herein made in conjunction with a case where the input device 48 is comprised of the touch panel.

In step (hereinafter referred to as ST) 1, a player executes a tap process. That is, the player taps on the touch panel (the touch panel is one of components of the display device 47, so, hereinafter the touch panel is also referred to as "the display device 47") that serves as the input device 48 displayed on the display device 47. Upon executing the tap process, operations are executed for a menu process ST2, an object tap process ST3 and self-character move process ST4.

Figure 15:
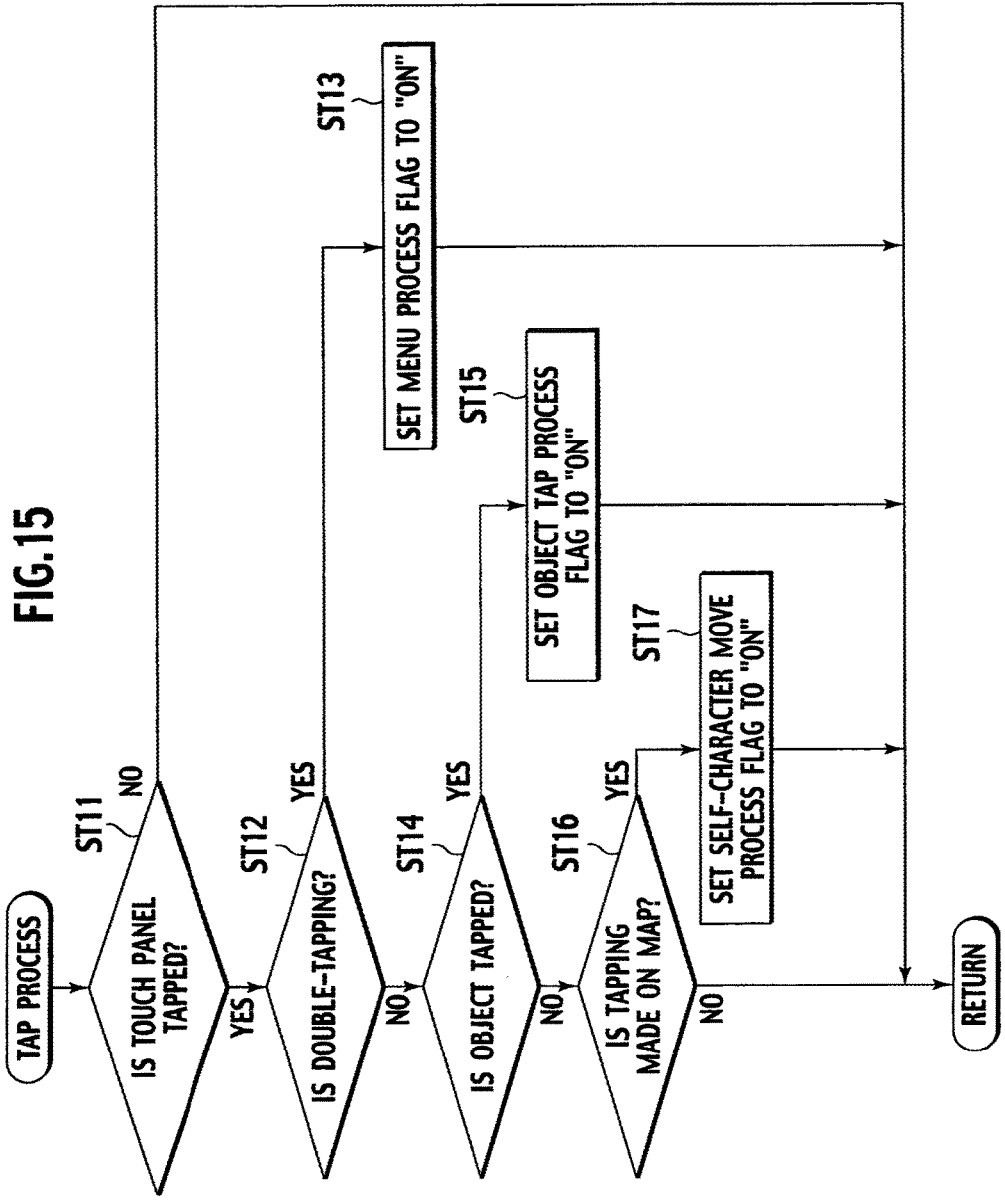
FIG. 15 is a flowchart for illustrating a tapping process in the gaming machine of the first embodiment according to the present invention.

FIG. 15 is a flowchart for illustrating the tap process in the gaming machine according to the present invention. During the tap process, depending on a position at which the player taps on the display device 47, the menu process, the object tap process or the self-character move process is executed respectively.

First, in ST 11, discrimination is made whether or not the player taps on the display device 47, that is, whether or not an input to the touch panel is made. With the tapping executed, discrimination is made whether or not the tapping of the player is involved in double-tapping (ST12). If the double tapping is present, a menu process flag is set to "ON" (ST13) and a menu 54 is displayed on the display device 47 as shown in FIG. 7B.

If no double-tapping is made, discrimination is made whether or not the tapping (single-tapping) is made on the object (the object tap process) (ST14). With the object tap process being executed, an object tap process flag is set to "ON" (ST15). The object tap process will be described later with reference to FIG. 16.

With no object tap process being executed, discrimination is made whether or not the tapping is made on the map (ST16). If the tapping is made on the map, a self-character move process flag is set to "ON" (ST17). Also although the operations are described in FIG. 15 in an order wherein discriminations are made on the double-tapping, the object tap and the tapping on the map, the present invention is not limited to such an order and the order in which discriminations are executed on the double tapping, the object tap and the tapping on the map may be configured in a manner different from that of FIG. 15.

Figure 16:
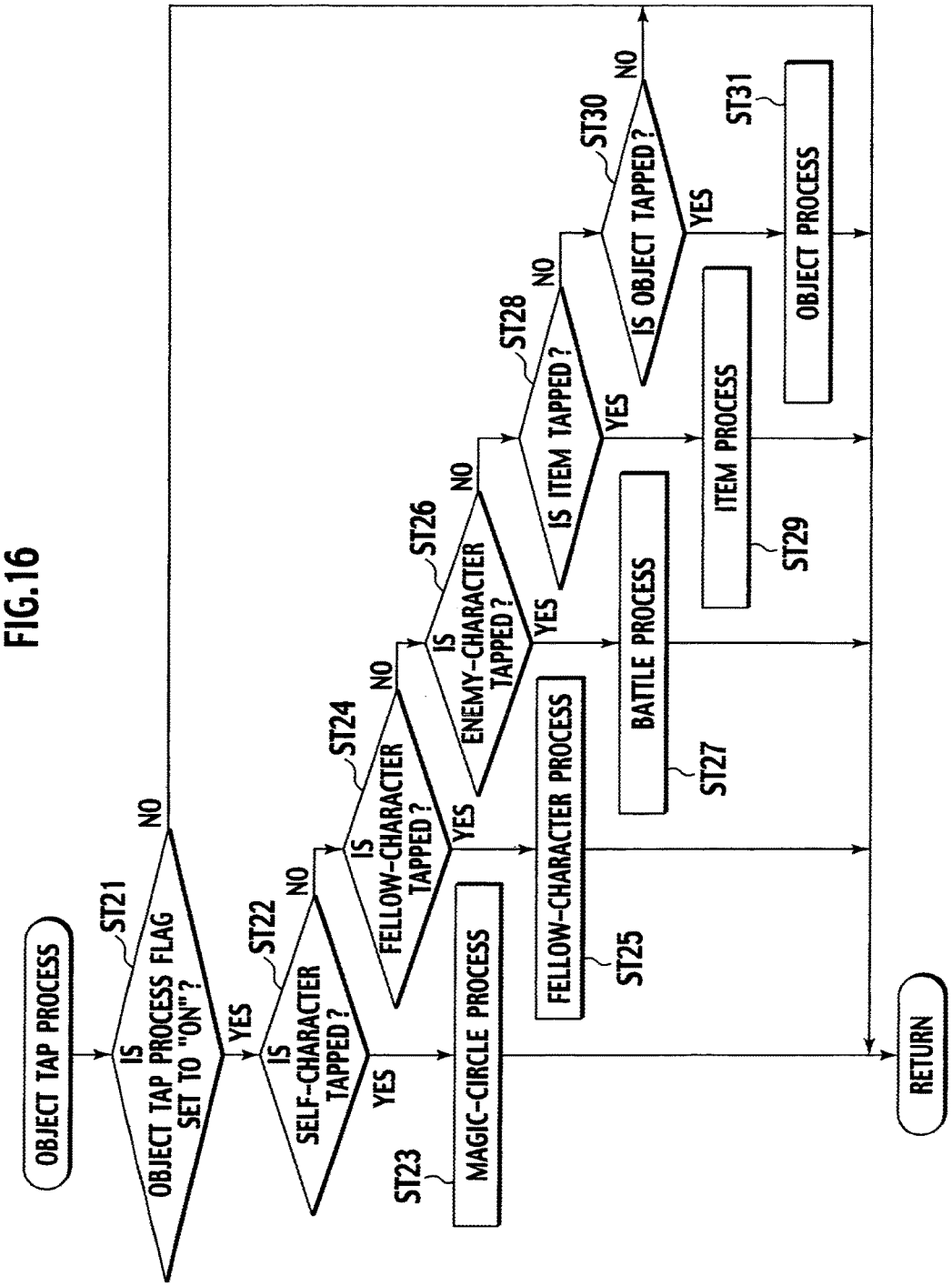
FIG. 16 is a flowchart for illustrating an object tapping process in the gaming machine of the first embodiment according to the present invention.

FIG. 16 is a view showing a flowchart for illustrating the object tap process in the gaming machine according to the present invention. In executing the object tap process, depending on positions at which the player taps on the display device, operations are practiced to perform a magic-circle process, a fellow process, a battle process, an item process or an object process.

First in ST21, discrimination is made whether or not the object tap process flag is set to "ON". If the object tap process flag is set to "ON", then, discrimination is made whether or not the self-character 23 is tapped (ST22). With the self-character is tapped, the magic-circle process is executed (ST23). The magic-circle process will be, described with reference to FIG. 17.

If the self-character 23 is not tapped, discrimination is made whether or not the fellow-character 25 is tapped (ST24). With the fellow-character is tapped, the fellow-character process is executed (ST25).

If the fellow-character 25 is not tapped, discrimination is made whether or not the enemy-character 21 is tapped (ST26). With the enemy-character 21 is tapped, the battle process is executed as shown in FIG. 6B (ST27).

If the enemy-character 21 is not tapped, discrimination is made whether or not the item is tapped (ST28). With the item being tapped, the item process is executed, leveling up the is character or the like as shown in FIG. 9B (ST29).

If the item is not tapped, discrimination is made whether or not the object (for instance, the milestone) is tapped (ST30). With the object is tapped, the object process is executed for leveling up the character's class as shown in FIG. 10B (ST31).

Also, although in FIG. 16, the operations are shown to discriminate the self-character tapping, the fellow-character tapping, the enemy-character tapping, the item tapping and the object tapping in this order, the present invention is not limited to such an order and an order, in which the operations are execute to discriminate the self-character tapping, the fellow-character tapping, the enemy-character tapping, the item tapping and the object tapping, may be altered to be different from that of FIG. 16. Also, the fellow-character tapping process, the enemy-character tapping process, the item tapping process and the object tapping process are herein omitted to simplify description.

Figure 17:
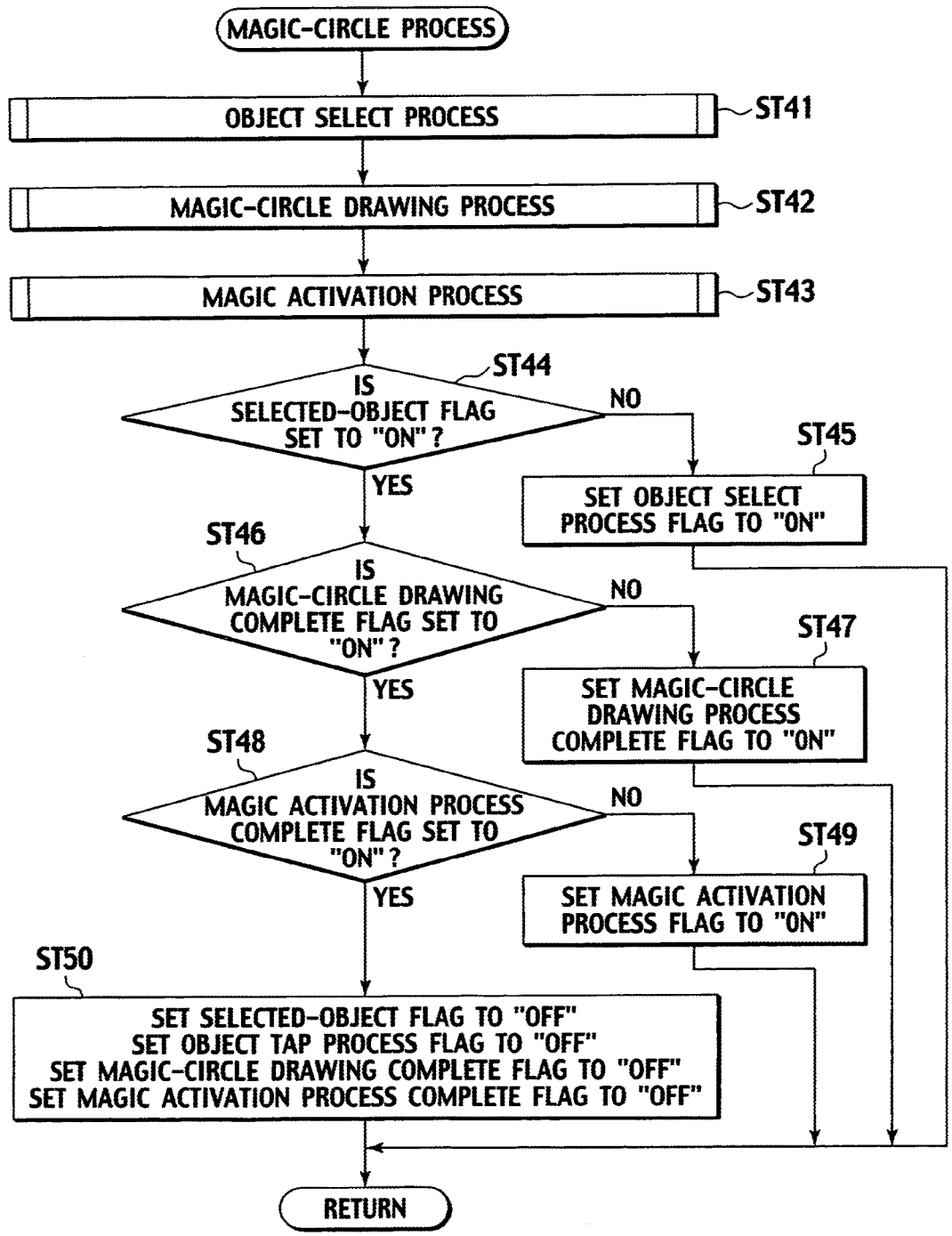
FIG. 17 is a flowchart for illustrating a magic-circle process in the gaming machine of the first embodiment according to the present invention.

FIG. 17 is a flowchart for illustrating the magic-circle process to be practiced in the gaming machine according to the present invention. In ST41, an object select process is executed for selecting an object displayed on the screen of the display device 47. The object select process will be described below with reference to FIG. 18. After the object has been selected, a magic-circle drawing process is then executed for specifying a special operation, such as magic attack, to be executed for the indicated object (ST42). Thereafter, a magic activation process is executed for practicing the specified magic attack correlated with the drawn magic-circle (ST43).

In ST44, discrimination is made whether or not a selected-object flag is set to "ON", that is, whether or not the object has been selected. If the selected-object flag is set to "ON", then discrimination is made whether a magic-circle drawing complete flag is set to "ON", that is, discrimination is made whether or not a magic-circle drawing has been completed (ST46). If no selected-object flag is set to "ON", then, the selected-object flag is set to "ON" (ST45).

If the magic-circle drawing complete flag is set to "ON", then, discrimination is made whether or not a magic activation process flag is set to "ON", that is, whether or not the magic activation process is completed (ST48). If no magic activation process complete flag is set to "ON", then, the magic-circle drawing process complete flag is set to "ON" (ST47).

If the magic activation process flag is set to "ON", then, the object tap process flag is set to "OFF"; the selected-object flag is set to "OFF"; the magic-circle drawing complete flag is set to "OFF"; and the magic activation process complete flag is set to "OFF" (ST50). That is, the object tap process is reset. If no magic activation process complete flag is set to "ON", then, the magic activation process complete flag is set to "ON" (ST49).

The magic-circle process, set forth above, is executed upon selecting the object, drawing the magic-circle and activating the indicated magic, such as magic attack. More particularly, after an object, to which the magic attack is activated, has been selected inputted positional information is detected and sign information is certified based on positional information detected within a predetermined time interval, upon which comparison is made between at least one sign data, which is preliminarily stored, and certified sign information to make discrimination whether or not sign information and sign data are correlated. This allows the magic-circle drawing process to be executed, Subsequently, with sign information and sign data found to be correlated, at least one gaming process, preliminarily stored in correlation with sign data, is executed. This allows the magic activation process to be executed.

That is, the player inputs on the input device 48 drawing a locus, also referred to as a sign, which is called as a magic-circle. The gaming machine executes an operation to crosscheck sign information, inputted by the player, and sign data correlated with a predetermined gaming process (for drawing the magic-circle). Then, if the crosschecking is successful, the relevant gaming process is executed (to perform magic activation process). Therefore, the player is able to execute the gaming process, which is desired by the player, by drawing a predetermined magic-circle (sign). Accordingly, the input operation per se, which the player directly executed on the screen, increases gaming capabilities with improved entertaining and exciting values in game.

Figure 18:
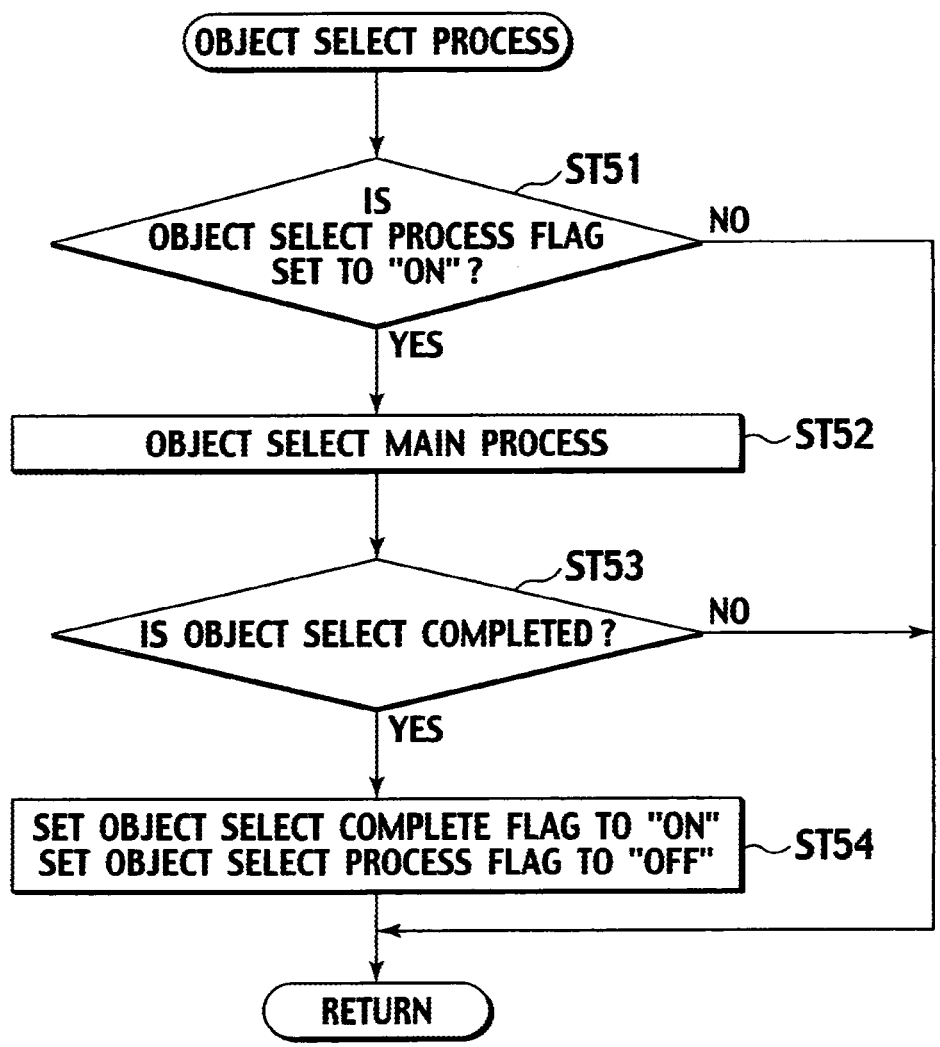
FIG. 18 is a flowchart for illustrating an object indicating process in the gaming machine of the first embodiment according to the present invention.

Hereunder, the object select process, the magic-circle drawing process and the magic activation process will be described further in detail. FIG. 18 is a flowchart for illustrating the object select process to be executed in the gaming machine according to the present invention. In ST51, discrimination is made whether or not an object select flag is set to "ON". If the object select flag is set to "ON", then, an object select main process is executed (ST52). During the object select main process, the operation is executed mainly for specifying a tap object for the object tap process.

Then, discrimination is made whether or not the object select is completed (ST53) and upon completion of the object select, an object select complete flag is set to "ON" whereas the object select process flag is set to "OFF" (ST54).

After the object select process has been completed, the magic-circle drawing process is executed. During the magic-circle drawing process, a sign (sign information which is calculated based on inputted sign (magic-circle)), drawn by the player for a predetermined time period, and sign data, which is preliminarily stored are crosschecked. That is, discrimination is made whether or not the player has completed the drawing within the predetermined time period, upon which resulting sign information is certified using preliminarily stored sign data.

Figure 19:
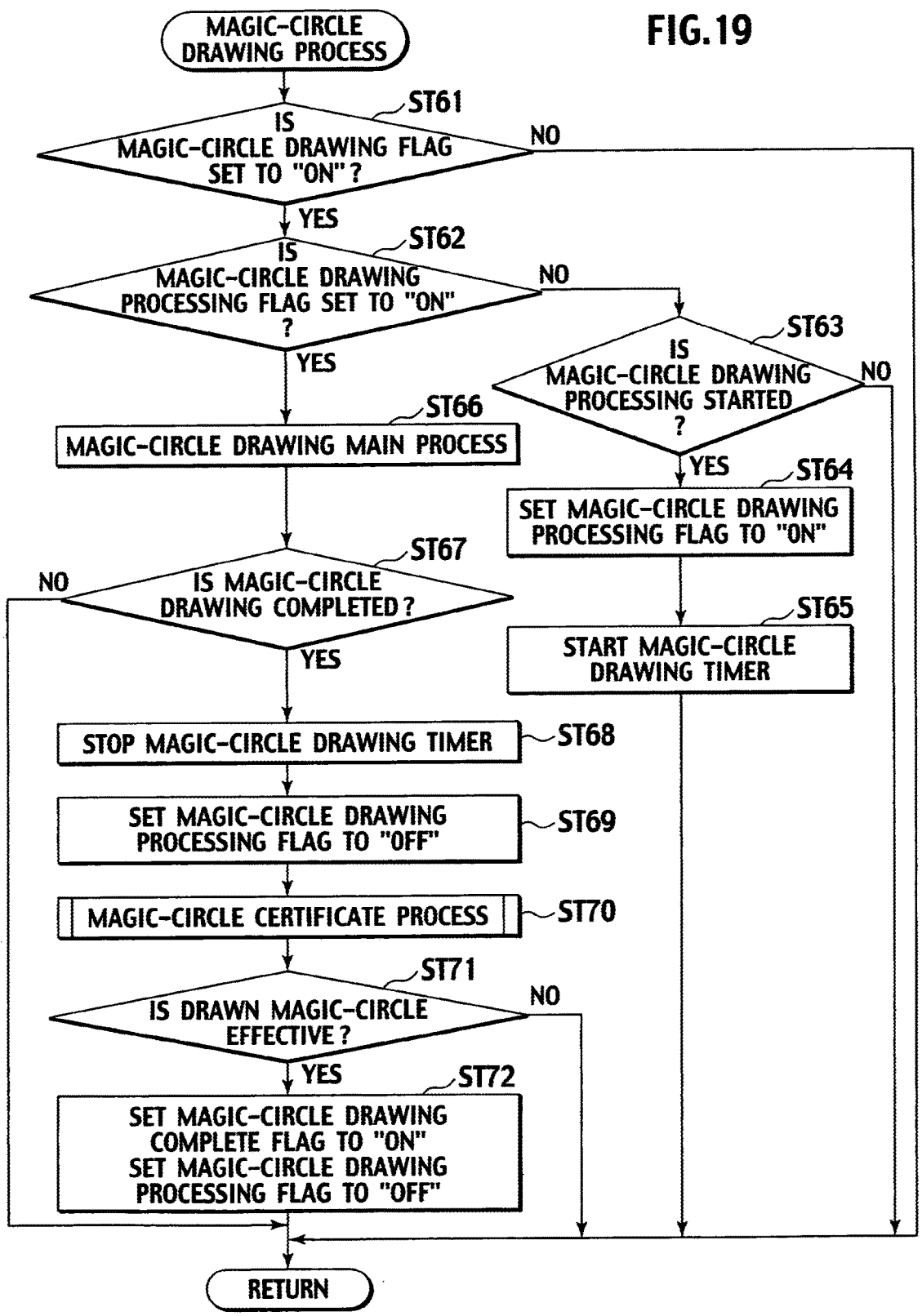
FIG. 19 is a flowchart for illustrating a magic-circle drawing process in the gaming machine of the first embodiment according to the present invention.

FIG. 19 is a flowchart for illustrating the magic-circle drawing process in the gaming machine according to the present invention. First, in ST61, discrimination is made whether or not the magic-circle drawing flag is set to "ON". If the magic-circle drawing flag is set to "ON", then, discrimination is made whether or not the magic-circle drawing processing flag is set to "ON" (ST62). If the magic-circle drawing processing flag is not set to "ON", discrimination is made whether the magic-circle drawing process is started (ST63).

As the player begins drawing the magic-circle (sign) to start the magic-circle drawing process, the operation is executed to measure a predetermined time period for which the drawing is being executed. That is, the magic-circle drawing processing flag is set to "ON" (ST64), starting a magic-circle drawing timer (ST65). Accordingly, the sign, drawn for the predetermined time period measured by the timer, is used as sign information for the magic-circle certificate process that will be described later.

During a period in which the magic-circle drawing processing flag is set to "ON", since the player is drawing the sign, the magic-circle drawing main process is practiced (ST66). During the magic-circle drawing main process, the operation is executed to detect positional information of the sign inputted by the player. In this moment, sign information, based on detected positional information, is displayed on the screen of the display device 47. By so doing, sign information, drawn by the player, is displayed on the screen and the player is able to confirm sign information, which the player has drawn, enabling the player to draw a desired sign while confirming the same.

Next, discrimination is made whether or not the magic-circle drawing has been completed (ST67). If the magic-circle drawing is completed, the magic-circle drawing timer is stopped (ST68) and the magic-circle drawing processing flag is set to "OFF" (ST69).

Then, the magic-circle certificate process is practiced using sign information drawn by the player (ST70). During the magic-circle certificate process, the operation is executed to crosscheck sign information and preliminarily stored sign data. That is, discrimination is made whether or not the drawn magic-circle is effective (ST71). In particular, the operation is executed to certify sign information, based on positional information detected for the predetermined time period, and comparison is made between at least one sign data, which is preliminarily stored, and sign information, which is certified, thereby discriminating whether or not sign information and sign data are correlated.

Figure 20:
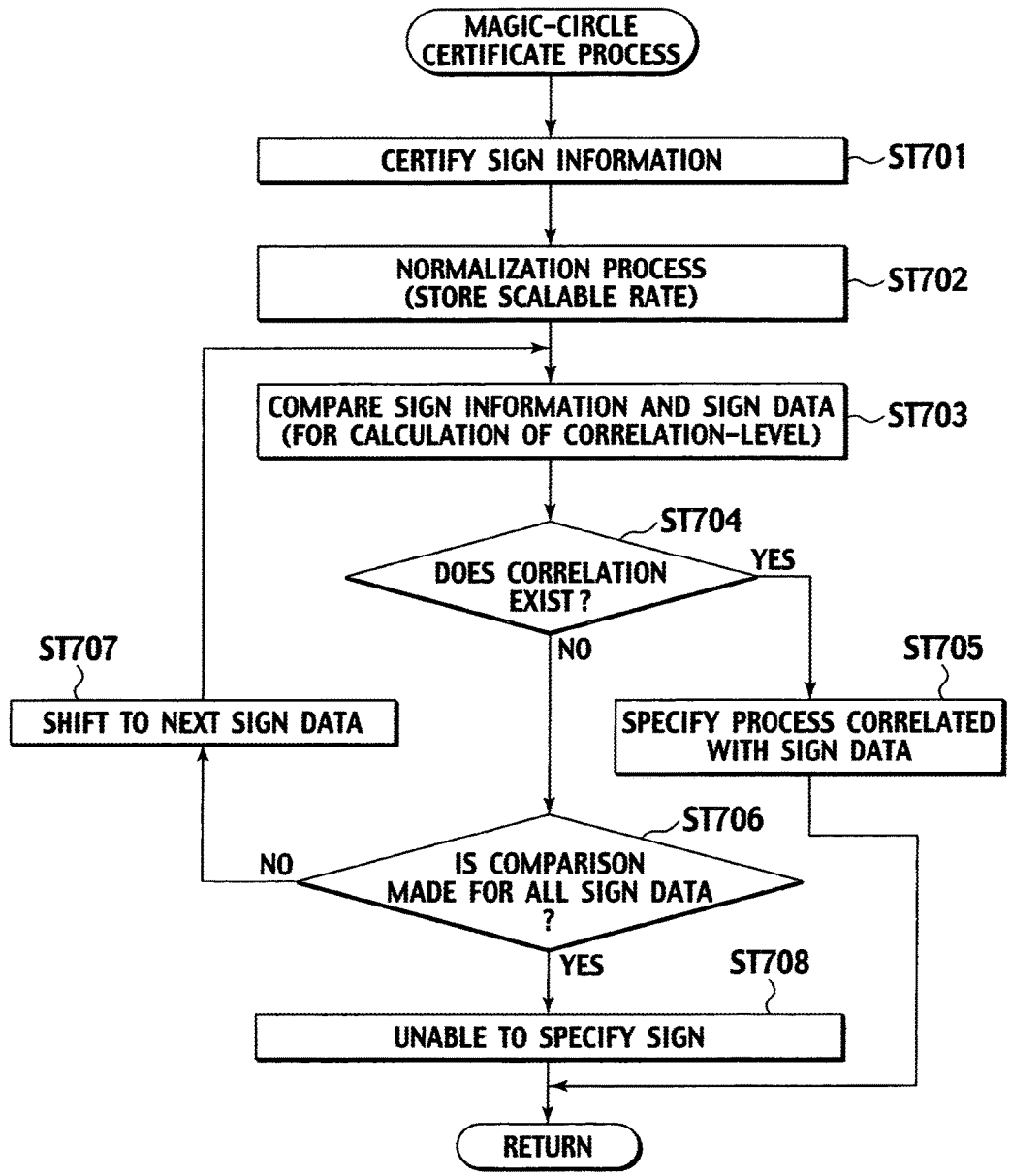
FIG. 20 is a flowchart for illustrating a magic-circle certificate process in the gaming machine of the first embodiment according to the present invention.

FIG. 20 is a flowchart for illustrating a concrete processing example of the magic-circle certificate process (ST70). Hereunder, description is made of the example of the magic-circle certificate process with reference to FIG. 20.

First, the CPU 43 is applied with positional information appearing at arbitrary points on the sign of the magic circle, which the player has drawn on the touch panel serving as the input device, every period (for instance, for every 0.05 seconds), upon which the CPU 43 stores these positional information in the memory 44 that serves as a positional information acquiring device. Respective positional information are stored in the form of, for instance, x-y coordinates values or vector data.

First, as the magic-circle certificate process is started, the CPU 43, serving as a sign-certifying device, executes the operation to certify sign information based on positional information stored in the memory 44 (ST701). The CPU 43, serving as the sign-certifying device, does not necessarily need to certify all of positional information, stored in the memory 44, as sign information and may be configured such that some of positional information (for instance, only positional information associated with proselytized points) among positional information, stored in the memory 44, are extracted to allow collected one of extracted positional information to be certified as sign information.

Subsequently, the CPU 43 executes a normalization process for sign information set forth above (ST702). As used herein, the terminology "normalization process" refers to a conversion process for sign information, that is, a process in which in order to enable comparison between sign information and subsequent sign data, a size and inclination (rotation) of the sign in sign information are corrected or a coordinates value, contained in sign information, is converted to a coordinates value with an origin at an arbitrary point (for instance, a start point of the sign). Also, it may be configured such that when executing the operation in a way to alter a size of the sign, a value (for instance, at rates of 1.3 times, 0.6 times or the like), indicative of a change in size, is stored in a scalable rate. The scalable rate can be used in a magnitude of a subsequent effect or a size in graphical effects shown when the magic attack is activated.

Then, the CPU 43, serving as a comparing and discriminating unit, reads out sign data from the storage device 46 and/or the memory 44, serving as a sign data storage device, making comparison between sign information and sign data (ST703). The CPU 43, serving as the comparing and discriminating unit, discriminates based on such comparison whether or not detected sign information and sign data are correlated (ST704). As used herein, the term "correlate" refers to a fact that a shape, predetermined by sign information, has a correlation with a shape, predetermined by sign data as a whole. Examples of situations, discriminated to be "correlated", involve not only a status where the shape, predetermined by sign information, and the shape, predetermined by sign data, are completely coincident with each other but also a status where it is possible to discriminate that these two factors are different in part but coincident to each other as a whole, and in such cases, both factors are treated as having the "correlation".

With the presently filed embodiment, a criterion for discriminating whether not the both factors are correlated is judged in terms of a predetermined correlation-level. As used herein, the term "correlation-level" refers to a numeric value indicative of a coincidence-level between a shape (in graphic symbol), represented by sign information, and a shape (in graphic symbol) represented by sign data. Although a variety of methods of calculating the correlation-level may be considered, one example of such methods may include a process of calculating a correlation-level in which a plurality of corresponding points are determined for the shape (in graphic symbol), represented by sign information, and the shape (in graphic symbol), represented by sign data, respectively, and the correlation-level is calculated using a total sum of distances of the relevant plural points. For instance, if the correlation-level is supposed to have a numeric value resulting from a total sum of the distances of the corresponding points subtracted from a value of 100 and the shape (in graphic symbol), represented by sign information and the shape (in graphic symbol), represented by sign data, are completely coincident to each other, the correlation-level is expressed as 100−0=100. In contrast, if the shape (in graphic symbol), represented by sign information, and the shape (in graphic symbol), represented by sign data, are different in part and a total sum of the distances of the corresponding points takes a value of 30, the correlation-level is expressed as 100−30=70. Thus, the operation for discriminating whether or not the correlation-level is present may be executed such that a threshold value related to the correlation-level is preliminarily determined to allow the calculation of the correlation-level between the shape (in graphic symbol), represented by sign information, and the shape (in graphic symbol), represented by sign data, in a manner mentioned above, upon which if the correlation-level exceeds the threshold value (of, for instance, 85), then, discrimination is made that the correlation-level is present between the associated factors whereas if the correlation-level is less than the threshold value, then, discrimination is made that no correlation-level is present.

When discriminating whether or not sign information and sign data are correlated with each other, sign information and sign data 61a, 61b, present in a mirror-image relationship as shown in FIG. 21A, are regarded to be involved in the correlation. Further, sign information and sign data 62a, 62b, present in a similarity relationship as shown in FIG. 21B, may be discriminated to be involved in the correlation.

In an exemplary case shown in FIG. 21B, when making comparison between sign information and sign data, sign information and sign data are subjected to the normalization process (ST702) for crosschecking. In such operation, the scalable rate, obtained in the relevant normalization process, may be reflected on effects in the gaming process.

When discriminating whether or not sign information and sign data are correlated, the operation is executed to select a gaming process correlated with sign information based on at least one stored signs data that is preliminarily stored. Such at least one sign data and a plurality of gaming processes are correlated to each another. Thus, a unique gaming process (such as, magic attack) is practiced depending on a shape of the sign drawn by the player. For instance, as shown in FIG. 21C, when a sign 63a is drawn, a magic attack is activated causing a fireball to hit a tapped enemy (target) 21. When a sign 63b is drawn, another magic attack is activated causing a lightning to hit the tapped enemy (target) 21 and when a sign 63c is drawn, still another magic attack is activated causing an aculeus to hit the tapped enemy (target) 21. By so doing, further improved gaming capabilities are provided to the player in practicing input operations directly activated on the screen of the display device 47. Also, no limitations are intended to the particular examples, described above, of these magic items, which may be implemented in suitably altered fashions.

These sign data may be configured to have unique predetermined time periods, respectively, for each of which a unique input is activated for each sign data. The gaming process may be so configured such that if no input of the sign is completed within the predetermined time period, no operation is executed in correlation with relevant sign data (for instance, no magic attack associated with the magic-circle is activated). Also, unique sign quantities may be provided for sign data, respectively. In these cases, the unique sign quantities may be displayed depending on unique predetermined time periods for which sign data are inputted. This allows sign data to have the unique predetermined time periods for sign data to be inputted and the unique sign quantities, respectively, enabling a difficulty-level to be provided to the sign to be drawn by the player. For instance, the difficulty-level may be allocated such that the longer the predetermined time period for a unique input to be activated and greater the unique sign quantity, the higher will be the difficulty-level.

Further, the unique sign quantities may be configured to be different from each another in view of a volume of and/or the number of the proselytized points of sign data set forth above. With such a structure, it becomes possible for a finely graded difficulty-level to be provided to the sign to be drawn by the player. For instance, a high difficulty-level can be provided with a large volume of and/or a great number of the proselytized points of sign data.

During the magic activation process (in the gaming process), the gaming process may be practiced in a varying effect depending on the unique predetermined time period and/or the unique sign quantity of the input set forth above. More particularly, under situations where the sign is drawn in a large size, as shown in FIG. 21B, or the sign is drawn with an increased number of proselytized points (angles on the sign), the gaming process may have an increased effect. For instance, a size of the fireball may be increased, thereby enabling an increased damage to be given to the enemy 21.

This enables magic to be implemented depending on a difficulty-level on inputting the magic-circle. For instance, it can be set such that the higher the difficulty-level on inputting, the greater will be the effect of the magic. This enables the player to draw the sign with an increased difficulty-level whereby the player is able to implement the magic with an increased effect. This results in improvement in gaming capabilities for the player to perform the input operations directly on the screen of the display device 47.

When making comparison and discrimination between sign information and sign data, the operation may be preferably executed to discriminate the correlation between at least one specific point of sign data and sign information. That is, sign data is provided with a specific point for crosschecking to allow the specific point of sign data and an associated specific point of sign information to be crosschecked for comparison and discrimination, enabling finely graded crosschecking to be performed with a resultant capability of achieving comparison and discrimination in highly increased precisions.

Figure 22:
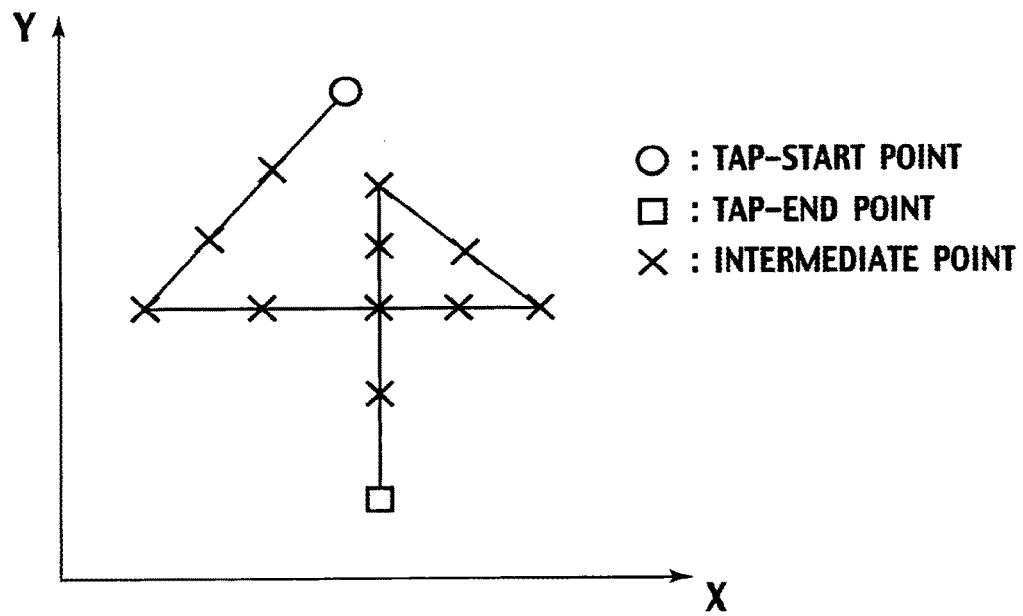
FIG. 22 is a view for illustrating comparison and discrimination for the magic-circle certificate process in the gaming machine of the first embodiment according to the present invention.

As used herein, the term "specific points" refers to, for instance, a tap-start point, a tap-end point and a medium-point as shown in FIG. 22. Thus, relative coordinates on these specific points, and an order, related to the tap-start point/medium-point/tap-end point, are preliminarily stored as sign data, thereby allowing comparison and discrimination on sign information. Accordingly, sign information, involved in the mirror-image relationship and the similarity relationship, are enabled to prepare objects to be compared based on sign data including the relative coordinates and the order of the tap-start point/medium-point/tap-end point.

Turning back to FIG. 20, the magic-circle certificate process is described

As a result of comparison process, if discrimination is made that the correlation exists (with "YES" in ST704), the CPU 43 specifies a process correlated with relevant sign data (ST705). For instance, the CPU 43, serving as the comparing and discriminating unit, reads out a process code stored in correlation with relevant sign data, from the storage device 46 and/or the memory 44 that play a role as a sign data storage device, and operates in a way to deliver the gaming process, correlated with relevant sign data, to the CPU 43 serving as a gaming processing unit.

On the contrary, as a result of comparison process, if it is discriminated that no correlation exists (with "NO" in ST704), the CPU 43, serving as the comparing and discriminating unit, discriminates whether or not comparison is made between all sign data, stored in the storage device 46 and/or the memory 44 playing a role as the sign data storage device, and sign information (ST706). If no comparison is completed between all sign data and sign information (with "NO" in ST706), the CPU 43 allows the operation to shift to next non-compared sign data (ST707) whereupon comparison is made between relevant sign data and sign information (ST703) to make discrimination as to whether or not the correlation exists between the sign data and the sign information (ST704). In the meanwhile, if comparison between all sign data and sign information is completed (with "YES" in ST706), the sign inputted by the player results in no correlation with any of sign data, which is preliminarily prepared, and the CPU 43, serving as the comparing and discriminating unit, operates to treat the sign as being unable to specify (ST708). For the above operations, the magic-circle certificate process is completed and the process control proceeds to ST71 shown in FIG. 20.

Upon certifying the magic-circle in such a way, if the drawn magic-circle is effective, the magic-circle drawing complete flag is set to "ON" and the magic-circle drawing processing flag is set to "OFF" (ST72). Then, the operation proceeds to the magic activation process.

Figure 23:
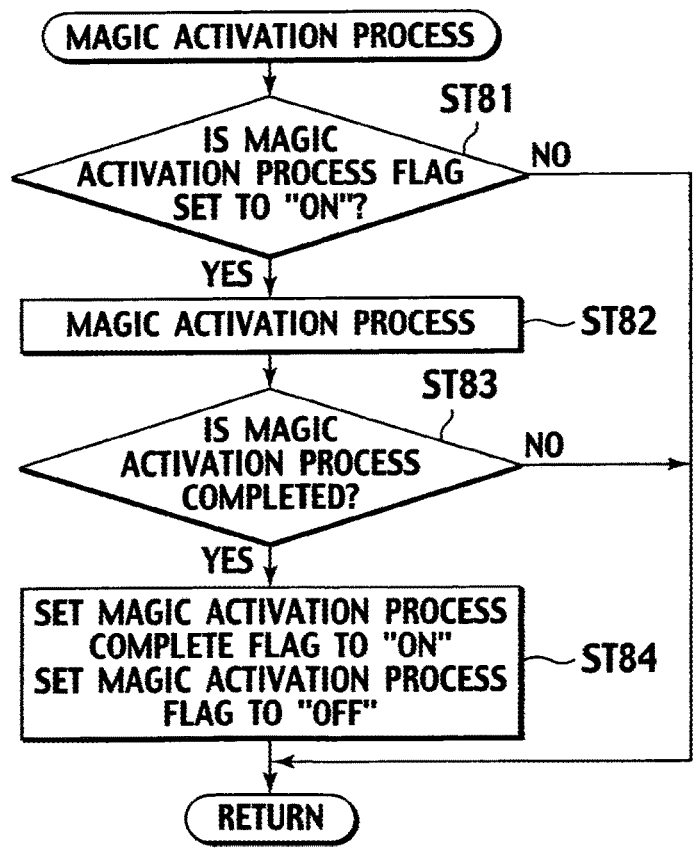
FIG. 23 is a flowchart for illustrating a magic-circle activation process in the gaming machine of the first embodiment according to the present invention.

FIG. 23 is a view for illustrating a gaming process after comparison and discrimination in the magic-circle certificate process has been completed in the gaming machine according to the present invention. In ST81, discrimination is made whether or not the magic activation process flag is set to "ON", if the magic activation process flag is set to "ON", that is, when the signs (magic-circle) drawn by the player is effective, the magic-circle activation main process is executed (ST82).

Since sign data is preliminarily correlated with the gaming process (such as, a magic attack), the CPU 43, serving as the gaming processing unit, executers the gaming process associated with certified sign data resulting from the sign (sign information) drawn by the player, and magic (magic attack) being activated on the enemy (in magic activation) is shown on the screen of the display device 47. Thereafter, discrimination is made whether or not the magic activation process is completed (ST83). Upon completion of the magic activation process, the magic activation process complete flag is set to "ON" and the magic activation process flag is set to "OFF" (ST84).

[Modified Form] (1) The present invention is not limited to the embodiment set forth above and may be implemented in a variety of modifications. For instance, while the above embodiment has been described in conjunction with the case where the game takes the arcade game, the present invention is not limited to such a case and may be applied to other RPG in a similar manner. Further, although the above embodiment has been described in connection with the case where the input device includes the touch panel, the present invention can be similarly applied to a case where the input device includes input devices other than the touch panel. Furthermore, the gaming machine of the present invention may be used either for arcade applications or consumer applications.

[Modified Form] (2) Moreover, the simulations on the gaming machine of the above embodiment have been described with reference to the data processing device, data processes for these simulations may be formed in software. For instance, a ROM may be configured to store programs of the above data processes (that is, a sequence of detecting positional information that is inputted, a sequence of certifying sign information based on positional information detected for a predetermined time period, a sequence of comparing is at least one sign data, which is preliminarily stored, to sign information that is certified, a sequence of discriminating whether or not sign information and sign data are correlated, and a sequence of implementing at least one preliminarily stored gaming process related to sign data) whereby the operations are executed depending on commands delivered from the CPU in accordance with the stored programs. Also, these data processing programs may be stored in a computer-readable record medium (such as, CD-ROM, DVD-ROM), in this case, the data processing programs is temporary read to a RAM of a computer to cause the operations to be executed in accordance with the data processing programs in the computer. Even such a case has the same operations and advantageous effects as those of the embodiment mentioned above.

[Modified Form] (3) While the above embodiment has been described with reference to a structure that employs an input mode under which a plurality of positions are concurrently inputted as shown in FIG. 13C, no need arises for a plurality of one inputs to be necessarily activated at the same time and the present invention may also be implemented in another input mode, that is, after an input of one position has been completed, an input of the other position is activated. For instance, the present invention is established even in the form of a structure wherein the medium point P3 between the positions P1, P2 is outputted on the input device 48 under circumstances wherein an operation timing of the signal processor 1001 is appropriately controlled and the left finger FL touches the position P1 to make inputting after which the left finger FL is released from the sensor panel 1000 upon which the position P2 is inputted by the right finger FR.

[Modified Form] (4) [Case With Two Signs Concurrently Inputted]

Although the above process represents a process example of a case in which the player draws one sign on the input device 48 by the player, the gaming machine 12 of the presently filed embodiment operates such that a situation where the player simultaneously inputs two signs is certified as one sign. Hereunder, description is made of an example of operation in which when the player simultaneously inputs the two signs, such operations are certified as one sign.

Figure 24A:
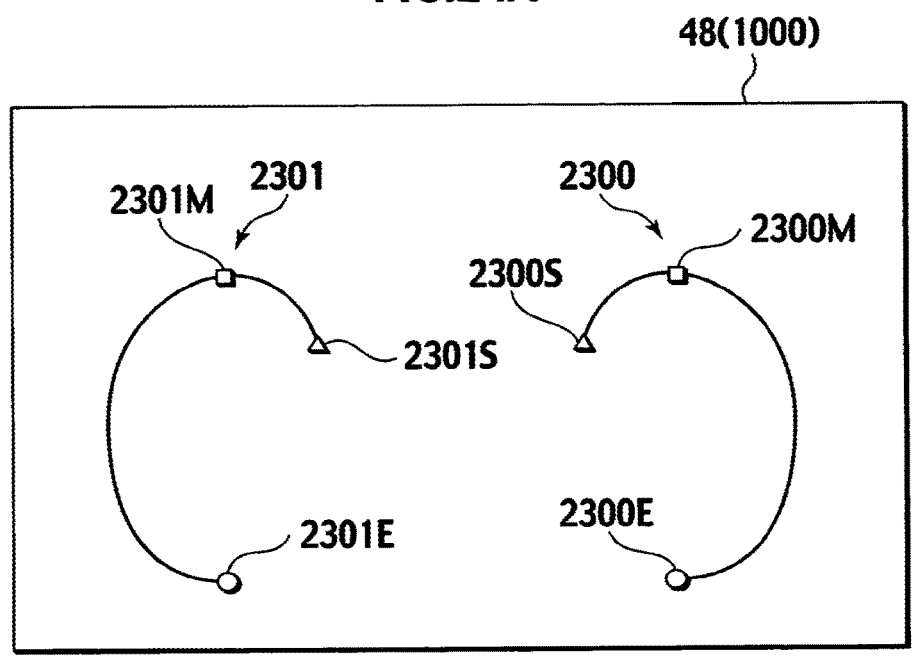
FIG. 24A is a view showing a second example in which two signs are concurrently inputted in an input device.

FIG. 24A is a view showing an example of one sign certified by the gaming machine 12 is when the player simultaneously inputs the two signs. Suppose the player draws a first sign 2300 with his right finger while simultaneously drawing a second sign 2301 with the left finger. In FIG. 24A, the signs 2300, 2301 have start points at contact points 2300S, 2301S, end points at contact points 2300E, 2301E and medium points at contact points 2300M, 2301M, respectively.

Further, as used herein, an expression in which "the first and second signs 2300, 2301 are synchronously drawn" is meant by a phase wherein for instance, the contact points 2300S, 2301S, forming the respective start points, are established at concurrent time t1; the contact points 2300M, 2301M, forming the respective medium points 2300M, 2301M, are established at concurrent time t2; and the contact points 2300E, 2301E, forming the respective end points, are established at concurrent time t3.

Figure 24B:
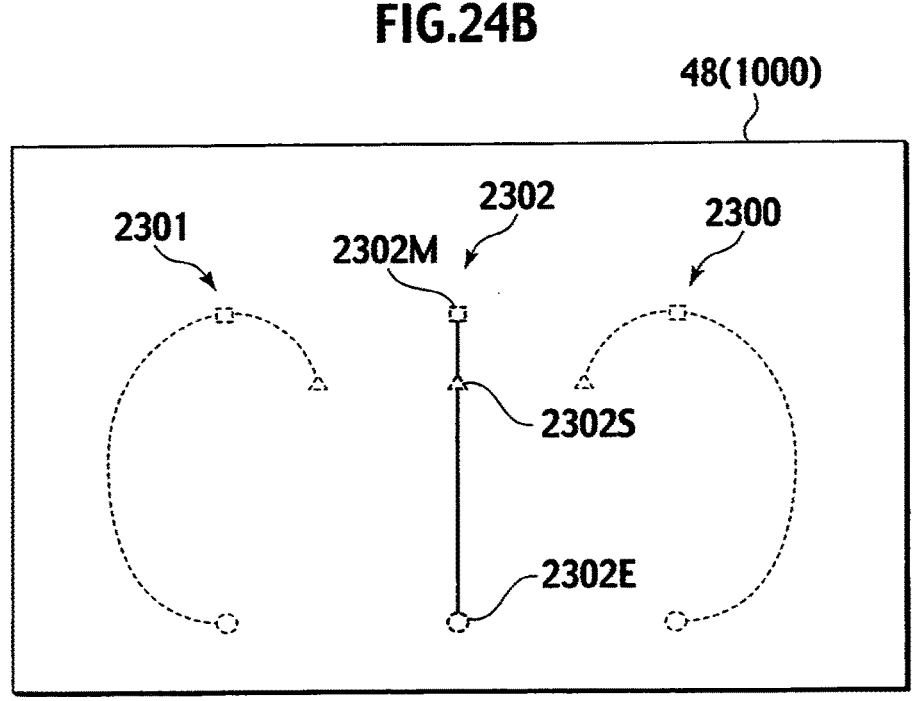
FIG. 24B is a view showing an example in which a sign is certified based on the two signs shown in FIG. 24A.

FIG. 24B is a view showing a sign (hereinafter referred to as a "detected sign") represented by positional information that is detected by the input device under cases where the player simultaneously draws the two signs 2300, 2301, as shown in FIG. 24A, on the input device 48 (sensor panel 1000). The detected sign 2302 has a start point at a detected point 2302S at time t1 and folds back at a detected point 2302M at time t2 to terminate at a detected point 2302E at time t3. That is, the detected sign 2302 is certified as a vertical linear sign as shown in FIG. 23B. Here, the detected point 2302S corresponds to a medium point between the contact points 2302S, 2301S, forming the respective start points as set forth above; the detected point 2302M corresponds to a medium point between the contact points 2300M, 2301M, forming the respective medium points as set forth above; and the detected point 2302E corresponds to a medium point between the contact points 2300E, 2301E, forming the respective end points as set forth above.

Thus, with the gaming machine 12 of the presently filed embodiment, upon operations of the player to draw the two signs in a synchronous fashion allows the two signs, which have been drawn, to be certified as one sign based on which various gaming processes are implemented.

Figure 25A:
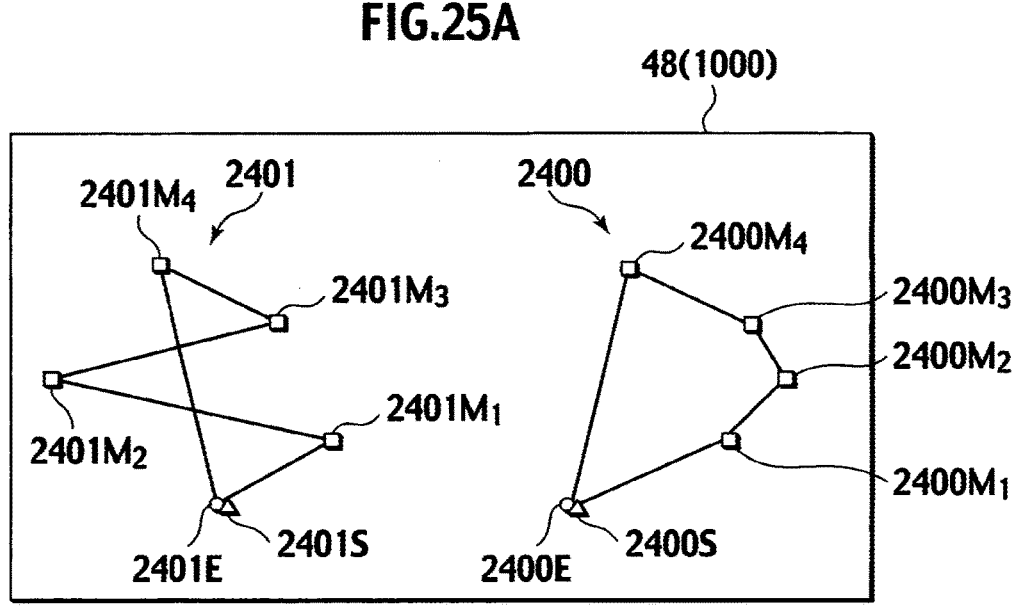
FIG. 25A is a view showing a third example in which two signs are concurrently inputted in an input device.
Figure 25B:
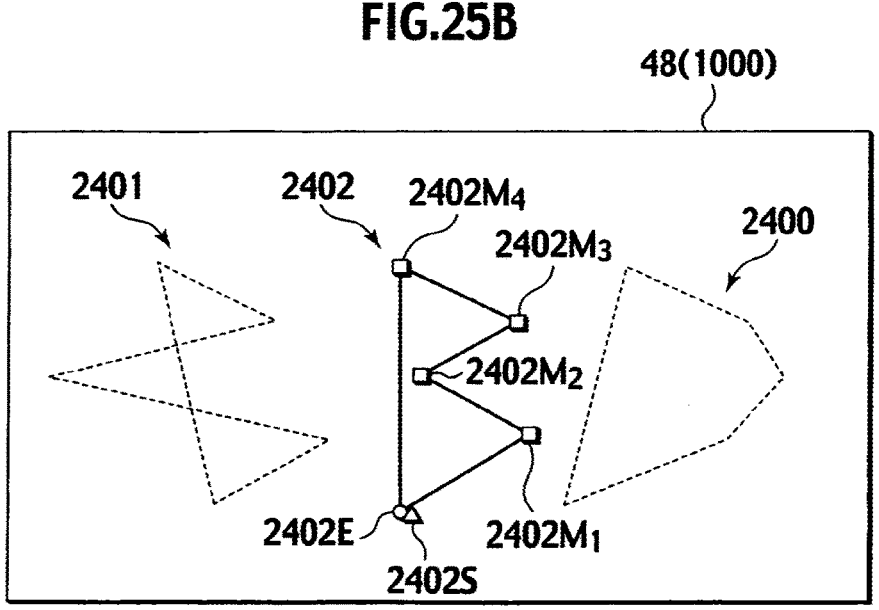
FIG. 25B is a view showing an example in which a sign is certified based on the two signs shown in FIG. 25A.

FIGS. 25A and 25B show examples of two signs, drawn in modes different from those shown in FIGS. 24A and 24B, and resulting one sign that is certified based on those two signs. In these examples, suppose the player draws a first sign 2400 on a surface of the input device 48 with this right finger while concurrently drawing a second sign 2401 with a left finger at timing synchronous with the sign 2400. In these drawing figures, the first sign 2400 includes a sign that has a start point at a contact point 2400S and passes across medium points $2400M_1$, $2400M_2$, $2400M_3$, $2400M_4$ in this order to terminate at the contact point 2400E. Also, the second sign 2401 has a start point at a contact point so 2401S and passes across medium points $2401M_1$, $2401M_2$, $2401M_3$, $2401M_4$ in this order to terminate at the contact point 2401E.

FIG. 25B is a view showing a sign (hereinafter referred to as a "detected sign") represented by positional information that is detected by the input device 48 under cases where the player simultaneously draws the two signs 2400, 2401, as shown in FIG. 25A, on the input device 48 (sensor panel 1000). The detected sign 2402 includes a sign that has a start point at a detected point 2402S and passes across detected points $2402M_1$, $2402M_2$, $2402M_3$, $2402M_4$ in this order to terminate at a detected point 2402E. That is, the detected sign 2402 is certified as a sign in the form of a substantially "B" shaped character as shown in the drawing figure.

Here, the detected point 2402S corresponds to a medium point between the contact points 2400S, 2401S, forming the start points of the first and second signs 2400, 2401 as set forth above; the detected points $2402M_1$ to $2402M_4$ correspond to medium points between the contact points $2400M_1$ to $2400M_4$ and $2401M_1$, to $2401M_4$, forming the medium points of the first and second signs 2400, 2401 as set forth above, respectively; and the detected point 2402E corresponds to a medium point between the contact points 2400E, 2401E forming the end points of the first and second signs 2400E, 2401E.

Like the examples mentioned above, appropriately selecting the first and second signs makes it possible to form the detected signs into a sign of a desired shape, that is, a sign with a specific configuration that makes up a key (trigger) for activation of a certain special magic.

The detected signs may be deemed to have detailed applications as described below.

With a certain event (for example, a player character 23 is grown up to a predetermined class, a predetermined event flag is established and a certain specified item is obtained), first and second signs are displayed over a liquid crystal display playing a role as the display device 47 of the gaming machine 12 to allow the player to simultaneously trace the displayed signs with the left and right fingers, setting off the first and second signs to be inputted on a transparent panel, placed on the liquid crystal display, which also plays a role as the input device 48. This displayed signs indicate a hidden sign to activate a hidden gaming process (such as, a magic attack).

Once the player successfully trace the signs and the hidden gaming process is activated, then the player can directly draw the hidden sign in the same shape as that of the player traced sign with one hand during the rests of operations subsequent to the hidden magic circle being initially activated. Such a structure allows the game to be performed in a further enhanced entertaining and exciting capabilities in a variety of patterns.

[Modified Form] (5) While the presently filed embodiment has been described above in conjunction with a structure wherein the same operations are implemented, under a case where the first and second signs are inputted with both hands to allow the resulting detected signs to form the predetermined sign and a case where the predetermined sign is provided by the single hand, whereby in any cases, the specified magic is activated in response to the predetermined sign, the present invention may be implemented in another alternative structure wherein an operation is executed in association with a predetermined sign only when the first and second signs are inputted by the both hands and the resulting detected signs form a predetermined signs that is, a specified magic is activated.

That is, the processor 42 may take the form of a structure that operates in accordance with certain specified signs under conditions including:

(i) The input device 48 detects inputs of signs corresponding to such specified signs.

(ii) The signs, detected by the input device 48, form a detected sign based on first and second signs. The processor 42 executes operation corresponding to this sign only when the conditions (i), (ii) are satisfied, whereas if the above conditions are unsatisfied, that is, when the predetermined sign is inputted by a single hand, no operation corresponding to such sign is executed.

With the condition (ii) is established, since it is considered that the total flow rates of electric current passing through, for instance, the terminals T1 to T4 in the structure shown in FIG. 11 take different values in a case under which the sign is drawn with a single hand and the other case under which the two signs are drawn with both hands, one example of a method can be considered to discriminate whether or not the condition (ii) is established based on the total flow rates of electric current. However, the present invention is not limited to such a method and may take another alternative method.

[Modified Form] (6) Although the above embodiment has been described with reference to a structure wherein the hardware characteristic of the touch sensor panel, which serves as the input device 48, allows the medium (center) position between the plural inputs, simultaneously activated, to be detected and outputted as the contact position, the present invention may be established even with a structure wherein respective coordinates positional information of a plurality of contact positions are outputted to the input device 48 to allow the processor 42 to acquire a medium (center) position upon calculation of the plurality of coordinates positional information for use in a process such as a process for certifying a magic-circle.

Also, it is considered that methods of outputting the respective coordinates positional information, associated with the plurality of contact positions to the input device 48 include a method of employing a touch panel sensor with a so-called matrix type panel structure, wherein sensor conductors are located in a lattice-like arrangement, and a method of locating first and second touch panels associated with the left and right hands, respectively, in a layout on the display device 47 at left and right areas thereof.

Second Embodiment

Hereunder, detailed description is made of a case where the present invention is applied to a slot machine, playing a role as a gaming machine of the present invention, with a touch panel and a game on the slot machine.

Figure 26:
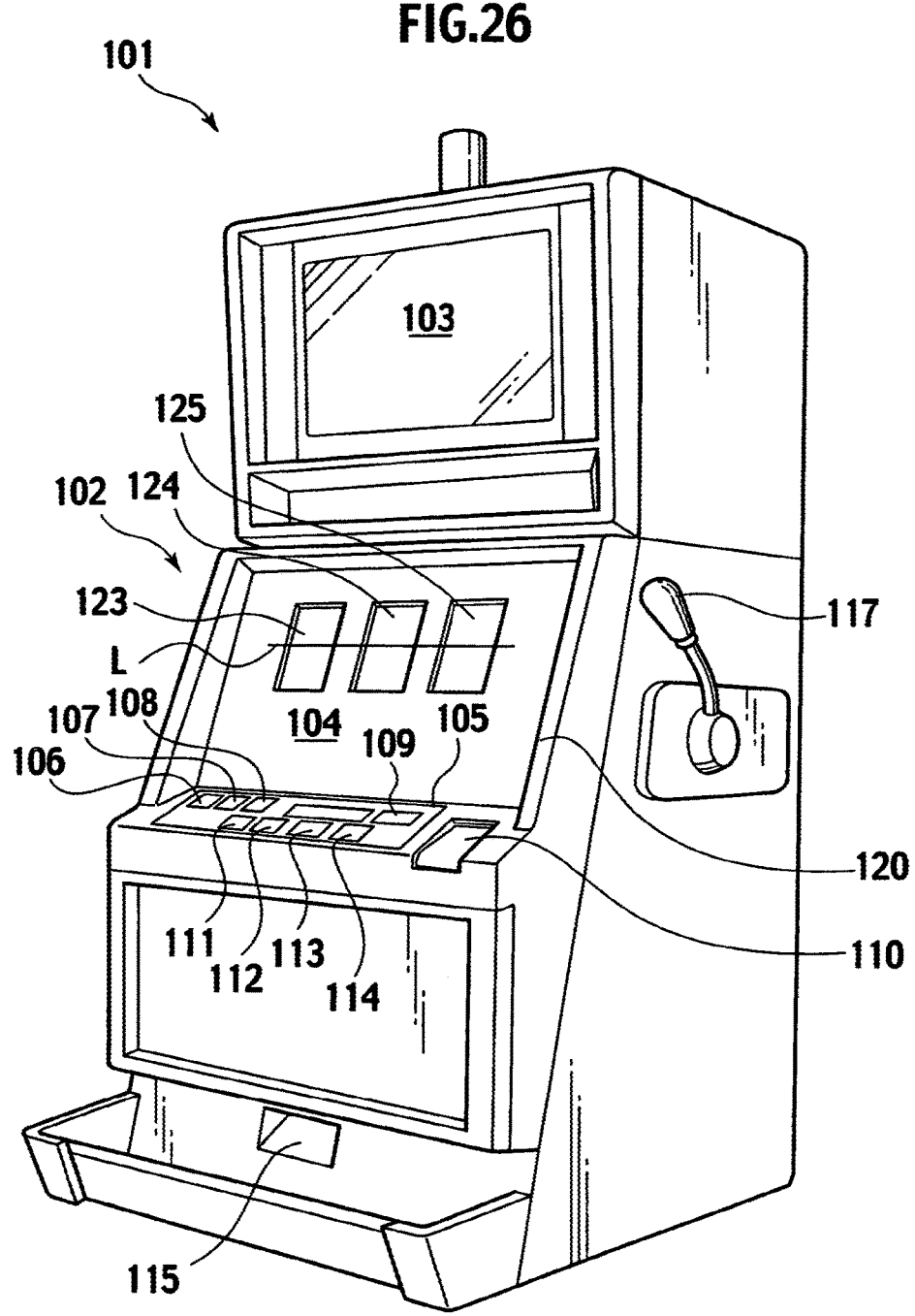
FIG. 26 is an outline view of a gaming machine of a second embodiment according to the present invention.
Figure 27:
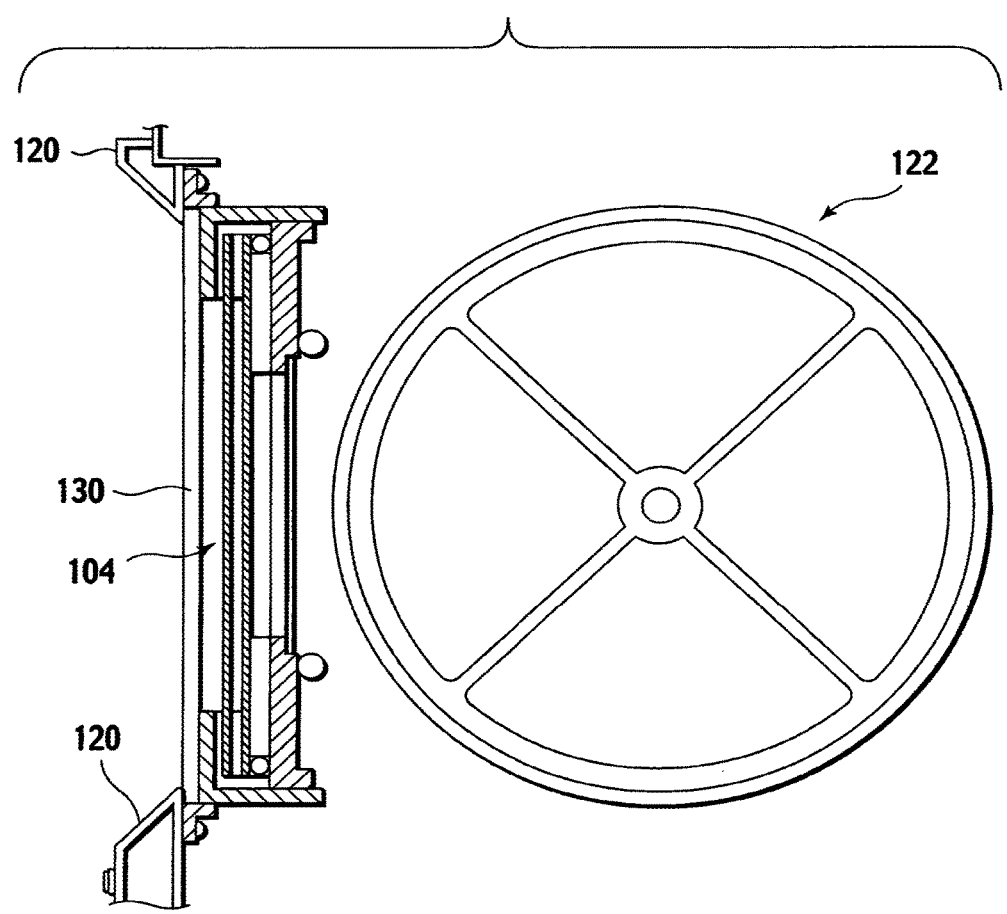
FIG. 27 is a partial cross-sectional view of the gaming machine of the second embodiment according to the present invention.

Referring to FIG. 26, a slot machine 101 has a cabinet 102 and further includes an upper LCD (first liquid crystal device) 103 located in an upper area of the cabinet 102, and a lower LCD (second liquid crystal device) 104 located in a lower area of the cabinet 102. Here, the upper LCD 102 includes a commercially and widely used liquid crystal, but the lower LCD 104 takes a structure that includes a so-called transparent LCD adapted to be suitably controlled whereby a player is able to view symbols provided on three reels 122 (FIG. 27 shows one of the three reels 122) located behind the lower LCD 104. Also, a lower side of the lower LCD 104 is provided with an operation table 105, equipped with various control buttons, and a start lever 117 mounted on the cabinet 102 at one side thereof.

For instance, as the slot machine 101 is given with a predetermined value with coins and bills inserted through a coin insertion slot 109 and/or a bill insertion slot 110, and the start lever 117 is rotated, a first game, which will be described later, is caused to start upon which, for instance, the three reels 122 (see FIG. 27), rotatably mounted inside the cabinet 102, rotate for predetermined time intervals and then stop, respectively. The symbols, provided on the respective reels 122, are viewed through display windows 123, 124, 125 located in positions associated with the respective reels 122 of the lower transparent LCD 104. Also, extending across the respective display windows 123, 124, 125 is a pay-line L. Although only one pay-line L is shown in FIG. 26, other pay-lines may be provided in a way to obliquely extend across the display windows 123, 124, 125 depending on values bet to the game. Also, the amount of value, to be given to the game, may be possible to be selected by BET buttons (1-BET button 111, 2-BET button (spin button) 112, a 3-BET button 113 and 5-BET button 114).

Under circumstances where the reels 122 stop and the symbols, which lie on the pay-line L activated depending on the predetermined value and the selected BET buttons 111, 112, 113, 114, are aligned with a winning combination, the operation is executed to pay the number of medals through a payout opening 115 at an amount depending on each winning combination or to allow a value at an amount depending on the winning to be temporarily stored in the slot machine 101.

As shown in FIG. 27, further, disposed in a front surface of the lower LCD 104 is a touch panel 130 that is fixedly secured together with the lower LCD 104 onto a front panel 120 of the cabinet 102 by means of suitable fixing segments, respectively.

Figure 28:
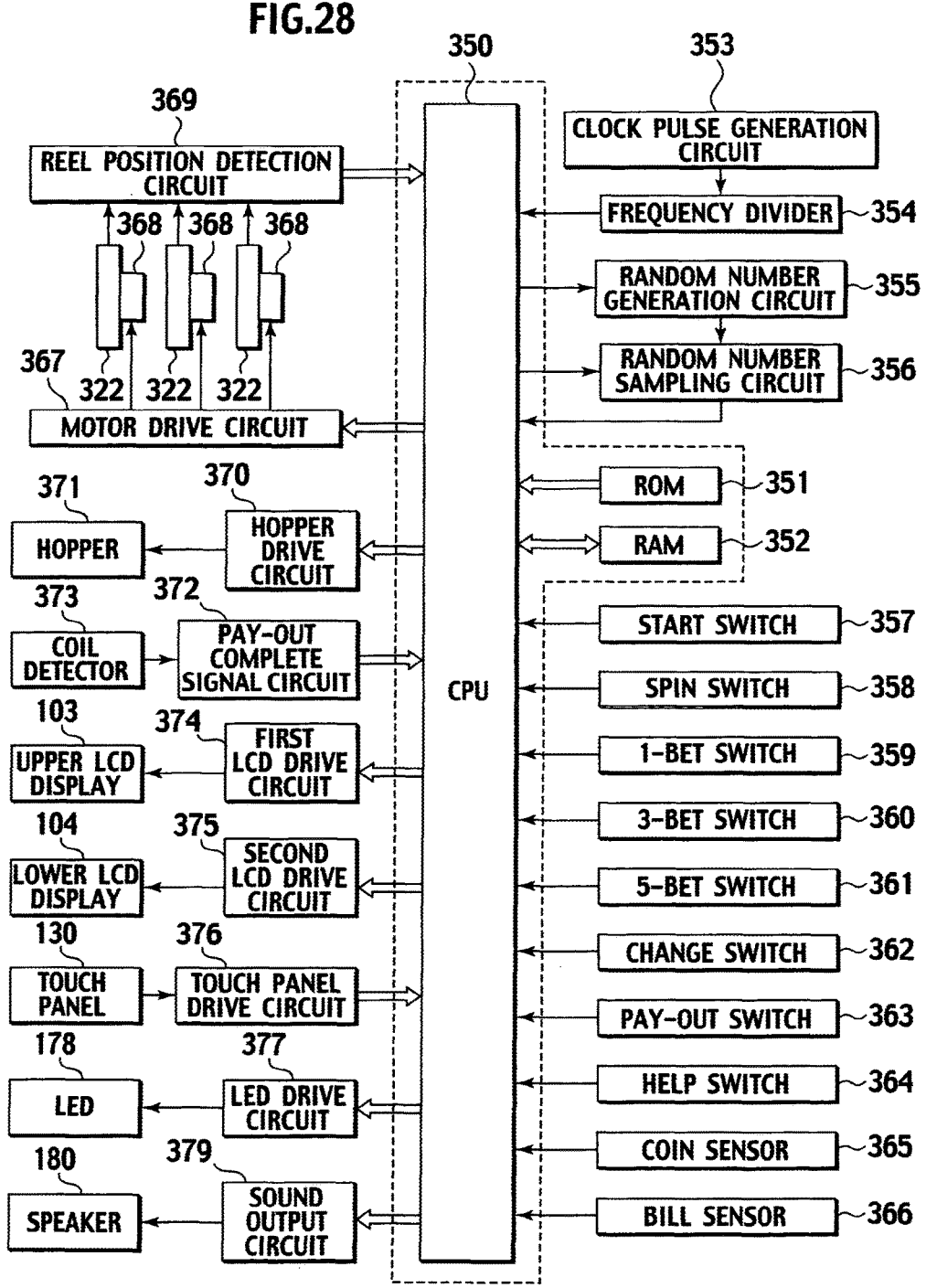
FIG. 28 is a block diagram for illustrating a control system of the gaming machine of the second embodiment according to the present invention.

A control system of the slot machine 101 is described with reference to FIG. 28. The control system of the slot machine 101 is generally comprised of a CPU 350 as a core, to which a ROM 351 and a RAM 352 are connected, respectively. The ROM 351 stores game control programs, various effect programs for permitting the upper LCD 103 and the lower LCD 104 to perform various effects on a progress of the game, a drawing table for executing drawings of various winning combinations, a variety of other programs needed for controlling the slot machine 101, and data tables. Further, the RAM 352 plays a role as a storage device that temporarily stores various data calculated by the CPU 350. The CPU 350 executes a first game based on the various programs stored in the ROM 351, while executing a second game when a specific condition is established during the first game.

Further, connected to the CPU 350 are a clock pulse generation circuit 353, which generates reference clock pulses, a frequency divider 354, a random number generation circuit 355, which generates random numbers, and a random number sampling circuit 356. The random numbers, sampled via the random number sampling circuit 356, are used for various drawings on symbols and effects for each reel 122. Here, the symbols to be stopped on the pay-line L are determined such that a range of the random numbers associated with the symbols for each reel 122 is set upon which the operation is executed referring to a random number value, extracted from a predetermined random number range (for instance, a value ranging from "0" to "255"), for each reel 122 and a "odds drawing table" (not shown) to discriminate which random number range of the symbols corresponds to the extracted random number. Further, connected to the CPU 350 are a start switch 357 connected to the start lever 117, a spin switch 358 connected to the spin button (2-BET button) 112, a 1-BET switch 359 connected to the 1-BET button 111, a 3-BET switch 360 connected to the 3-BET button 113, a 5-BET switch 361 connected to the 5-BET button 114, an exchange (change) switch 362 connected to an exchange button 106, a pay-out switch 363 connected to a payout button 107, and a help switch 364 connected to a help button 108. The CPU 350 controls in a way to execute various operations associated with the various buttons based on switch signals outputted from the respective switches 357 to 364 when the associated buttons are depressed, respectively.

Additionally, connected to the CPU 350 are a coin sensor 365 located in the coin insertion slot 109 and a bill sensor 366 located in the bill insertion slot 110. The coin sensor 365 detects the coins inserted through the coin insertion slot 109 and the CPU 350 calculates the number of coins based on coin detection signals outputted from the coin sensor 365. The bill sensor 366 detects the kind and amount of bills inserted through the bill insertion slot 110 and the CPU 350 calculates the number of coins equivalent to the amount of bills based on bill detection signals outputted from the bill sensor 366.

Three stepping motors 368 are connected to the CPU 350 via a motor drive circuit 367 by which respective reels 122 are rotatably driven and a reel position detection circuit 369 is also connected to the CPU 43. With motor drive signals outputted from the CPU 350 to the motor drive circuit 367, the motor drive circuit 367 rotatably drives the respective stepping motors 368. This allows the rotations of respective reels 122.

When this takes place, after the respective reels 122 have started rotating, the numbers of drive pulses supplied to the respective stepping motors 368 are calculated and resulting calculated values are written in a predetermined area of the RAM 352. Further, a reset pulse is outputted from each reel 122 for every one rotation and each reset pulse is inputted to the CPU 350 through the reel position detection circuit 369. Thus, if the reset pulses are inputted to the CPU 350, the calculated values, written in the RAM 352, are cleared to "0". When this occurs, the CPU 350 certifies a rotational position of the symbol on each reel 122 depending upon the calculated value, associated with the rotational position within one-rotation range of each reel 122, and a symbol table wherein a rotational position, stored in the ROM 351, of each reel 122 and a symbol, formed on an outer periphery of each reel 122, are associated with each other.

A hopper 371 is connected to the CPU 350 via a hopper drive circuit 370. As a drive signal is outputted from the CPU 350 to the hopper drive circuit 370, the hopper 371 pays out a predetermined number of coins from the coin payout opening 115.

Further, a coin detector 373 is connected to the CPU 350 via a payout complete signal circuit 372. The coin detector 373 is disposed inside the coin payout opening 115 and when it is detected that the predetermined number of coins are paid out from the coin payout opening 115, outputs a coin-paid-out detection signal to the payout complete signal circuit 372 based on which the payout complete signal circuit 372 outputs a payout complete signal to the CPU 350.

Furthermore, the upper LCD 103 is connected through a first LCD driver circuit 374 to the CPU 350, and the lower LCD 104 is also connected via a second LCD driver circuit 375. Moreover, the touch panel 130 is connected to the CPU 350 through a touch panel drive circuit 376.

In addition, LEDs 178 are connected to the CPU 350 via an LED drive circuit 377. A large number of LEDs are arrayed on a front face of the slot machine 101 and, when performing various effects, controllably lighted by the LED drive circuit 377 in response to drive signals delivered from the CPU 350. Also, a sound output circuit 379 and a speaker (not shown) are connected to the CPU 350 and the speaker 180 serves to generate various sound effects when performing various effects in response to output signals from the sound output circuit 379.

With the slot machine 101, the rotations of the respective reels 122 cause the symbols, drawn on respective circumferential peripheries, to be displayed in varying modes and stopping the rotation of the reels 122 cause the symbols to stop for display thereby permitting the first game, which will be described later, to proceed.

Figure 29:
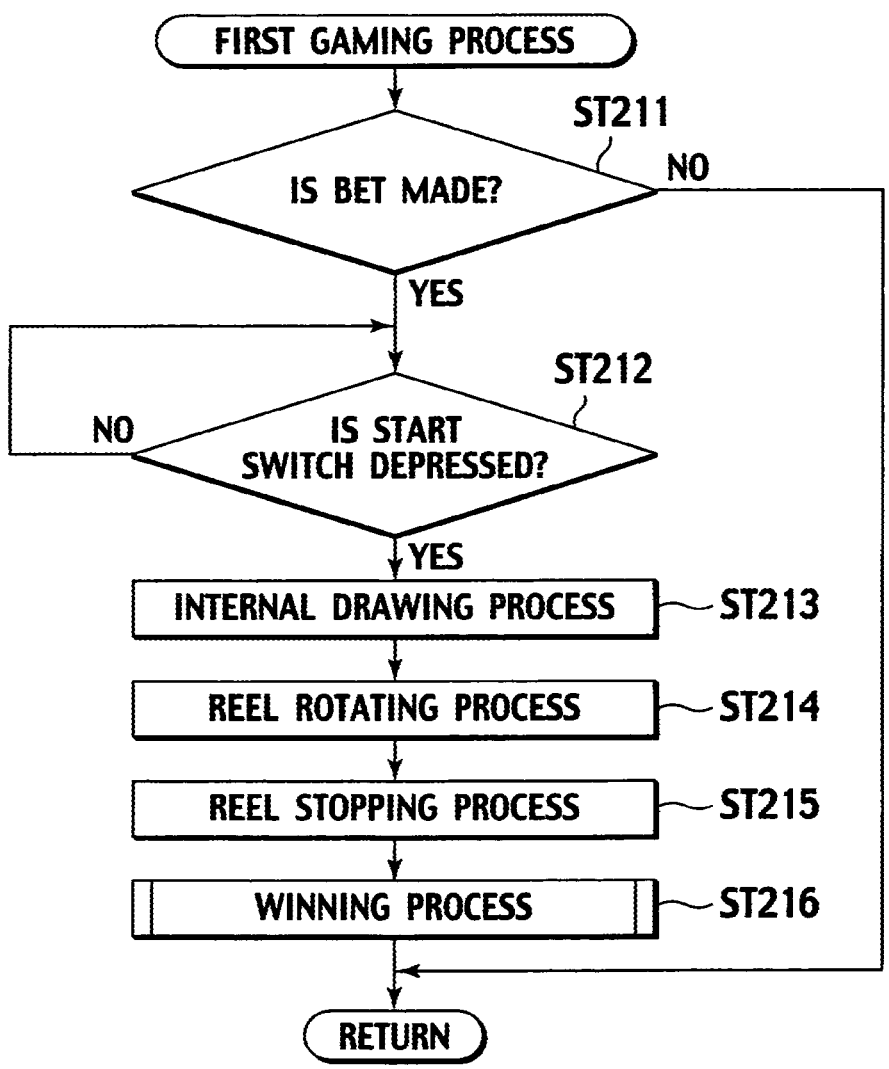
FIG. 29 is a flowchart for illustrating a first gaming process in the second embodiment according to the present invention.

Hereunder, operations of the first game are described with reference to FIG. 29.

Initially, discrimination is made whether or not the coins or bills are inserted and the BET is selected (ST211). Upon executing such operation, the CPU 350 discriminates whether or not a signal, indicative of the operation executed by the player to make the BET, is received. When discrimination is made that the signal is received, the operation proceeds to ST212 and, on the contrary, if discrimination is made that no signal is received, a current subroutine is completed.

It may be configured such that the BET process is automatically executed when the player inserts the coins or executed for the first time when the player depresses any of the BET buttons 111, 112, 113, 114.

Next, discrimination is made whether or not the player depresses the start switch 357 commanding to start the first game (ST212). During such operation, the CPU 350 discriminates whether or not a signal, indicative of the start switch 357 is depressed by the player, is received. When discrimination is made that the signal is received, the operation proceeds to ST213 and, in contrast, if discrimination is made that no signal is received, the operation in step ST212 is executed again.

Then, an internal drawing process is executed (ST213). During such a process, the CPU 350 delivers a command to the random number generation circuit 355 for generating a random number, and the random number generation circuit 355 generates the random numbers in response to the command. Then, the CPU 350 stores internal drawing data, based on the resulting random numbers, in the predetermined area of the RAM 352. Also, the internal drawing data involves data indicative of combination modes of the symbols that are made possible to be stopped and displayed upon winning on a special winning combination or a regular winning combination.

Also, the present invention may take the form of a structure wherein the random numbers are generated in software (upon executing a predetermined updating of a numeric value on a fixed or non-fixed cycles) by the CPU 350, the programs stored in the ROM 351, and the RAM 352 to allow internal drawing data to be stored in the predetermined area of the RAM 352 depending on the resulting random numbers. In such a case, it is not needed to provide the random number generation circuit 352.

Next, a reel rotating process is executed (ST214). During the reel rotating process, the CPU 350 delivers a signal to the motor drive circuit 367 in order to rotate the reels 122. Additionally, during the execution of the first game, the LCD drive circuits 375, 376 allow various effects to be performed on the upper LCD 103 and the lower LCD 104 in suitable fashions, respectively, while controllably lighting the LEDs and performing the effects with sound voices.

Then, a reel stop process is executed (ST215). During such a process, the CPU 350 delivers a signal to the motor drive circuit 367 so as to stop rotating the reels 122.

As a result of the first game, if a combination of the plurality of stopped symbols is involved in a predetermined combination, that is, when the symbols on the reels 122 are aligned with a predetermined winning combination, the second game is practiced.

Figure 30:
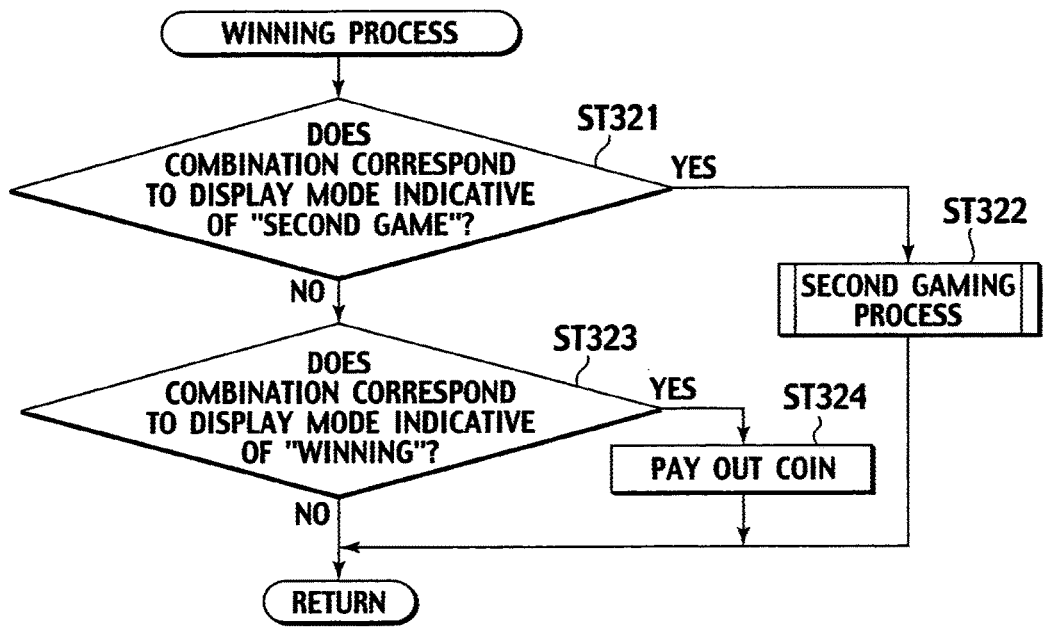
FIG. 30 is a flowchart for illustrating an winning process in the second embodiment according to the present invention.

Then, the winning process is executed (ST216). During operation of such a winning process, the CPU 350 executes the winning process based on the symbols of the stopped reels 122. After the operation in ST216 is completed, the current subroutine is completed Next, the above winning process is described with reference to FIG. 30.

Initially, discrimination is made whether or not a combination of the symbols on the reels 122 stopped in the first game is involved in a winning mode for "start of a second game" (ST321). That is, during such a process, the CPU 350 discriminates whether or not the combination of the symbols in ST215 of the subroutine shown in FIG. 29 indicates a shift to the second game.

When discrimination is made that the shift to the second game is indicated, the CPU 350 executes the second gaming process (ST322). The second game can be executed without a need for inserting any further coins and carried out under a rule different from that of the first game. Also, the second game will be described below in detail.

If discrimination is made in ST322 that the combination of the symbols does not indicate the shift to the second game, then, discrimination is made whether or not the combination of the symbols wins (for instance, on "special winning combination" or "regular winning combination) (ST323). If discrimination is made that the combination of the symbols is involved in the winning of the winning mode, the CPU 350 pays out coins depending on the winning mode (ST324). If discrimination is made in ST323 that the combination of the symbols is not involved in the winning mode, or if the operations in ST322 or ST324 are executed, the current subroutine is completed. Also, the CPU 350 serves as a first game control device that controls the first game based on the reels 122.

Figure 31:
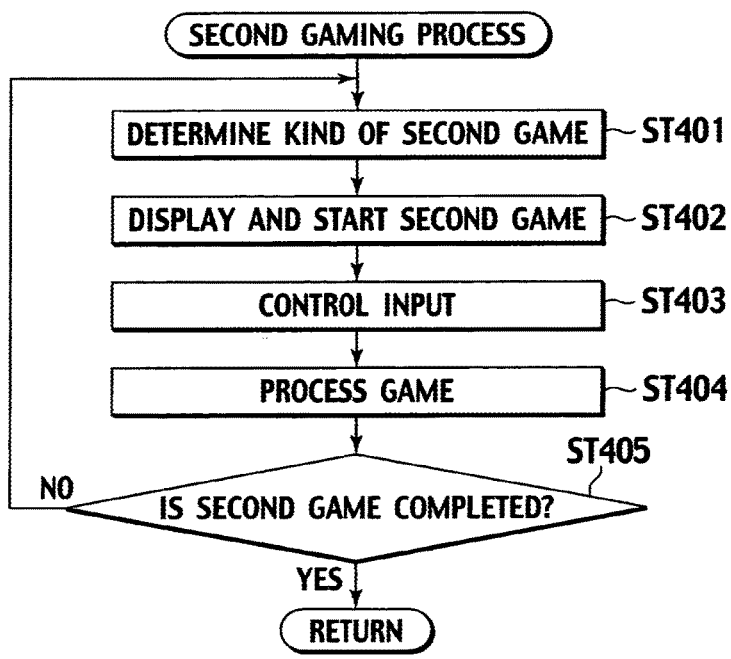
FIG. 31 is a flowchart for illustrating a second gaming process in the second embodiment according to the present invention.

Next, the second gaming process is described with reference to FIG. 31. Hereunder, the CPU 350 serves as a second game control device that controls the second game and also serves as a third game control device that integrates the functions of the first gaming device mentioned above.

As, the second gaming process starts, the CPU 350 determines at least one game from a plurality of second games, stored in the ROM 351, in accordance with a predetermined condition or in a random fashion, allowing the determined game to be displayed on the lower LCD 104 (ST401, ST402).

Here, for instance, the second game has the mode shown in FIG. 2 set forth above. That is, in the second game, the player operates tapping the self-character 23 on the touch panel 130 (control input: ST403) and executing predetermined operations, for instance, drawing the magic-circle to attack the enemy 21 (process game: ST404) allows the number of winning coins to be determined in the second game depending on the degree of attack in success. Here, the particulars related to the control to be inputted by the player have been already described with reference to the first embodiment and are omitted herein. The operations from ST401 to ST404 are continuously executed until the predetermined condition is established, upon which if no condition is satisfied, the operation is routed back to ST401 to restart the second game and if the condition is satisfied, the relevant subroutine is completed (ST405).

Also, the second game may include a play, for instance, to select a card in a card game or a play to draw a predetermined letter string and graphic symbol.

Further, the slot machine 101 of the second embodiment may be configured such that the second game is executed by either the upper LCD 103 or the lower LCD 104 Or executed to straddle the upper LCD 103 and the lower LCD 104. Also, another alternative may be such that the second game is executed in each of the upper LCD 103 and the lower LCD 104 to be different from each other.

Moreover, the second embodiment is not limited to the slot machine and may have applications to a pachinko gaming machine, a pachi-slot gaming machine (a Japanese slot machine) and a pin ball, all of which are equipped with touch panels, respectively.

With the gaming machine of the second embodiment, permitting a player to execute various operations on the touch panel in two games, by which the player is apt to be passive, allows the player to participate on the game in an aggressive manner whereby entertaining and exciting capabilities are further improved. Further, in such an event, the plural gaming processes can be associated with a plurality of gaming processes in limited input areas without causing the games to be less susceptible with a better arm like the first embodiment set forth above.

[Advantageous Effects]

With the gaming machines and the programs of the present invention, the input device is configured to allow a predetermined sign to be drawn for practicing the gaming processes associated with such a sign and, therefore, the input operations per se are enabled to have gaming properties. In addition, since the inputs of the signs activated upon inputting the plurality of positions can be treated as an input operation, it becomes possible to provide a game with the input operations per se provided with further improved gaming properties. Also, even in a case where a player must move his finger for a long distance for performing the inputting, touching a sign at several points allows the inputting of the sign to be completed, realizing the inputting in comfort within a shortened period of time.

What is claimed is:

1. A gaming machine comprising:
    a touch panel that accepts inputs indicating a plurality of points from a player;
    a positional information certifying unit that outputs positional information based on the inputs indicating the plurality of points accepted by the touch panel;
    a sign information generating unit that generates sign information which is drawn based on the positional information depending on the plurality of points, outputted from the positional information certifying unit;
    a sign data storage device that stores a plurality of sign data which are correlated with a plurality of predetermined gaming processes, respectively;
    a comparing and discriminating unit that makes comparison between the sign information, generated by the sign information generating unit, and the sign data, stored in the sign data storage device, and discriminates whether or not the sign information and the sign data are correlated with each other; and
    a gaming processing unit that executes a predetermined gaming process, correlated with the correlated sign data among the plurality of predetermined gaming processes, according to the sign information which is drawn by sequentially connecting the plurality of points, under a condition where the comparing and discriminating unit discriminates that the sign information and the sign data are correlated with each other,
    wherein when the plurality of points are sequentially connected, a path between two adjacent points among the sequentially connected points is not inputted by the player, and
    wherein the comparing and discriminating unit discriminates whether or not the sign information and the sign data are correlated with each other by comparing specific points among the plurality of points with specific points of the sign data.

2. The gaming machine according to claim 1; wherein
    the sign data storage device is configured to store a plurality of sign data, which are correlated with at least one gaming process, respectively; and
    the comparing and discriminating unit includes a sign data selecting unit configured to select sign data, having a maximum correlation with the sign information, from the plurality of sign data.

3. The gaming machine according to claim 1, wherein the positional information certifying unit is operative such that when the plurality of positions are concurrently inputted to the touch panel, at least one of medium points, center points and gravity center points on the plurality of points are outputted as positional information.

4. The gaming machine according to claim 1, wherein
    the positional information certifying unit is operative such that when the plurality of positions are concurrently inputted to the touch panel, positional information, indicative of one position, is generated based on the plurality of positions;
    the sign information generating unit generates sign information based on the positional information indicative of the one position; and
    the comparing and discriminating unit makes comparison between the sign information, generated based on the positional information indicative of the one position, and the sign data, stored in the sign data storage device, and discriminates whether or not the sign information and the sign data are correlated with each other.

5. The gaming machine according to claim 4, wherein
    the sign data storage unit is configured to store a plurality of sign data which are correlated to at least one gaming process, respectively; and
    the comparing and discriminating unit further includes a sign data selecting unit that selects sign data, having a maximum correlation with the sign information, from the plurality of sign data.

6. The gaming machine according to claim 4, further comprising:
    a display device operative to show a display related to the sign information based on one positional information generated by the positional information certifying unit when the plurality of positions are concurrently inputted to the touch panel.

7. The gaming machine according to claim 6, wherein
    the touch panel includes a transparent touch panel disposed on the display device, and the display device is operative to show signs, to be inputted, based on the sign data for a plurality of inputs, respectively.

8. The gaming machine according to claim 4, wherein the positional information certifying unit is operative such that when the plurality of positions are concurrently inputted to the touch panel, at least one of medium points, center points and gravity center points on the plurality of points are outputted as positional information indicative of the one position.

9. The gaming machine according to claim 1, further comprising:
 a first game controller which controls a first game; and
 a second game controller which triggers a second game when a predetermined outcome appears in the first game;
 wherein the second game controller executes the second game while rendering the positional information acquiring unit to acquire the inputted positional information, rendering the comparison and discriminating unit to discriminate whether the acquired positional information is correlated with the sign information certified by the sign information recognizing unit, the second game controller controls the gaming processing unit to execute a predetermined gaming process when the acquired positional information is correlated with the certified sign data.

10. A program operable by a computer, comprising the steps of:
 preliminarily storing a plurality of sign data which are correlated with a plurality of gaming processes, respectively;
 generating positional information based on a plurality of points that are inputted;
 generating sign information which is drawn based on the positional information depending on the plurality of points;
 making comparison between the sign information and the sign data and discriminating whether or not the sign information and the sign data are correlated with each other;
 allowing a computer to execute a predetermined gaming process, related to the correlated sign data among the plurality of predetermined gaming processes, according to the sign information which is drawn by sequentially connecting the plurality of points, when discrimination is made that the sign information and the sign data are correlated with each other,
 wherein when the plurality of points are sequentially connected, a path between two adjacent points among the sequentially connected points is not inputted by the player, and
 wherein the comparing and discriminating unit discriminates whether or not the sign information and the sign data are correlated with each other by comparing specific points among the plurality of points with specific points of the sign data.

11. The program according to claim 10, wherein
 the sign data includes a plurality of sign data composed of at least one gaming process, respectively; and
 the step of discriminating further includes a step of selecting sign data, having a maximum correlation with the sign information, from the plurality of sign data.

12. The program according to claim 10, wherein
 when a plurality of positions are concurrently inputted, the positional information, to be generated in the step of generating the positional information, includes at least one of medium points, center points and gravity center points on the plurality of points.

13. The program according to claim 10, wherein
 when the plurality of positions are concurrently inputted, positional information, indicative of one position, is generated based on the plurality of positions in the step of generating the positional information;
 sign information is generated based on the positional information indicative of the one position in the step of generating sign information; and
 the comparison is made in the step of discriminating between the sign information, generated based on the positional information indicative of the one position, and the sign data, which is preliminarily stored, and the discrimination is made whether or not the sign information and the sign data are correlated with each other.

14. The program according to claim 13, wherein
 the sign data includes a plurality of sign data composed of at least one gaming process, respectively; and
 the step of discriminating further includes a step of selecting sign data, having a maximum correlation with the sign information, from the plurality of sign data.

15. The program according to claim 13, further comprising a step of:
 showing a display related to the sign information based on the one position, generated in the step of generating the positional information, when the plurality of positions are concurrently inputted.

16. The program according to claim 15, wherein
 when the plurality of positions are concurrently inputted in the step of displaying, a sign to be inputted is displayed based on the sign data for a plurality of inputs, respectively.

17. The program according to claim 13, wherein
 when the plurality of positions are concurrently inputted medium points, center points or gravity center points on the plurality of points are outputted as positional information, indicative of the one position, in the step of generating the positional information.

18. A gaming machine comprising:
 a touch panel that accepts inputs indicating a plurality of points from a player;
 a positional information certifying unit that outputs positional information based on the input indicating the plurality of points accepted by the touch panel;
 a sign information generating unit that generates sign information drawn based on the positional information outputted from the positional information certifying unit;
 a sign data storage device that stores a plurality of sign data which are correlated with a plurality of predetermined gaming processes, respectively;
 a comparing and discriminating unit that makes comparison between the sign information, generated by the sign information generating unit, and the sign data, stored in the sign data storage device, and discriminating whether or not the sign information and the sign data are correlated with each other; and
 a gaming processing unit that executes a predetermined gaming process, correlated with the correlated sign data among the plurality of predetermined gaming processes, according to the sign information which is drawn by sequentially connecting the plurality of points, under a condition where the comparing and discriminating unit discriminates that the sign information and the sign data are correlated with each other, wherein when the plurality of points are sequentially connected, a path between two adjacent points among the sequentially connected points is not inputted by the player, wherein the comparing and discriminating unit discriminates whether or not the sign information and the sign data are correlated with each other by comparing specific points among the plurality of points with specific points of the sign data, and wherein, when the plurality of points are simultaneously inputted:

the positional information certifying unit generates the positional information based on a representative point of the plurality of points, the representative point representing a medium point, a center point or a center gravity point of the plurality of positions;

the sign information generating unit generate the sign information which is drawn based on the positional information depending on the representative point of the plurality of positions;

the comparing and discriminating unit makes comparison between the sign information which is drawn by the representative point of the plurality of positions, and the sign data, stored in the sign data storage device, and discriminates whether or not the sign information and the sign data are correlated with each other; and wherein the gaming processing unit that executes a predetermined gaming process, correlated with the correlated sign data according to the sign information which is drawn by the representative point of the plurality of positions.

19. A program operable by a computer, comprising:

preliminarily storing a plurality of sign data which are correlated with a plurality of gaming processes, respectively;

generating positional information based on a plurality of points that are inputted;

generating sign information which is drawn based on the positional information depending on the plurality of points;

making comparison between the sign information and the sign data and discriminating whether or not the sign information and the sign data are correlated with each other; and allowing a computer to execute a predetermined gaming process, related to the correlated sign data among the plurality of predetermined gaming processes, according to the sign information which is drawn by sequentially connecting the plurality of points, when discrimination is made that the sign information and the sign data are correlated with each other, wherein when the plurality of points are sequentially connected, a path between two adjacent points among the sequentially connected points is not inputted by the player, wherein the comparing and discriminating unit discriminates whether or not the sign information and the sign data are correlated with each other by comparing specific points among the plurality of points with specific points of the sign data, and wherein, when the plurality of points are simultaneously inputted:

the positional information is generated based on a representative point of the plurality of points, the representative point representing a medium point, a center point or a center gravity point of the plurality of positions;

the sign information which is drawn based on the positional information depending on the representative point of the plurality of positions is generated;

comparison between the sign information which is drawn by the representative point of the plurality of positions, and the preliminarily stored sign data is made to discriminate whether or not the sign information and the sign data are correlated with each other; and a predetermined gaming process, correlated with the correlated sign data according to the sign information which is drawn by the representative point of the plurality of positions is executed.

20. A gaming machine comprising:

a touch panel that accepts inputs indicating a plurality of points from a player;

a positional information certifying unit that outputs positional information based on the inputs indicating the plurality of points accepted by the touch panel;

a sign information generating unit that generates sign information which is drawn based on the positional information depending on the plurality of points, outputted from the positional information certifying unit;

a sign data storage device that stores a plurality of sign data which are correlated with a plurality of predetermined gaming processes, respectively;

a comparing and discriminating unit that makes comparison between the sign information, generated by the sign information generating unit, and the sign data, stored in the sign data storage device, and discriminates whether or not the sign information and the sign data are correlated with each other; and a gaming processing unit that executes a predetermined gaming process, correlated with the correlated sign data among the plurality of predetermined gaming processes, according to the sign information which is drawn by sequentially connecting the plurality of points, under a condition where the comparing and discriminating unit discriminates that the sign information and the sign data are correlated with each other, wherein the comparing and discriminating unit executes a normalization process which converts a size and/or an inclination of a sign in the sign information in order to enable the comparison between the sign information and the sign data before discriminating whether or not the sign information and the sign data are correlated with each other, and wherein the gaming processing unit varies an effect in the executed gaming process in accordance with a scalable rate and/or the inclination in the normalization process.

21. A gaming machine comprising:

a touch panel that accepts inputs indicating a plurality of points from a player;

a positional information certifying unit that outputs positional information based on the inputs indicating the plurality of points accepted by the touch panel;

a sign information generating unit that generates sign information which is drawn based on the positional information depending on the plurality of points, outputted from the positional information certifying unit;

a sign data storage device that stores a plurality of sign data which are correlated with a plurality of predetermined gaming processes, respectively;

a comparing and discriminating unit that makes comparison between the sign information, generated by the sign information generating unit, and the sign data, stored in the sign data storage device, and discriminates whether or not the sign information and the sign data are correlated with each other; and a gaming processing unit that executes a predetermined gaming process, correlated with the correlated sign data among the plurality of predetermined gaming processes, according to the sign information which is drawn by sequentially connecting the plurality of points, under a condition where the comparing and discriminating unit discriminates that the sign information and the sign data are correlated with each other, wherein the comparing and discriminating unit executes a normalization process which converts a size and/or an inclination of a sign in the sign information in order to enable the comparison between the sign information and the sign data before discriminating whether or not the sign information and the sign data are correlated with each other, and wherein the gaming processing unit varies an effect graphic display in the executed gaming process in accordance with a scalable rate and/or the inclination in the normalization process.

22. A gaming machine comprising:

a touch panel that accepts inputs indicating a plurality of points from a player;

a positional information certifying unit that outputs positional information based on the inputs indicating the plurality of points accepted by the touch panel;

a sign information generating unit that generates sign information which is drawn based on the positional information depending on the plurality of points, outputted from the positional information certifying unit;

a sign data storage device that stores a plurality of sign data which are correlated with a plurality of predetermined gaming processes, respectively;

a comparing and discriminating unit that makes comparison between the sign information, generated by the sign information generating unit, and the sign data, stored in the sign data storage device, and discriminates whether or not the sign information and the sign data are correlated with each other; and a gaming processing unit that executes a predetermined gaming process, correlated with the correlated sign data among the plurality of predetermined gaming processes, according to the sign information which is drawn by sequentially connecting the plurality of points, under a condition where the comparing and discriminating unit discriminates that the sign information and the sign data are correlated with each other, wherein the gaming processing unit varies an effect in the executed gaming process in accordance with at least one of a size of the sign information, a timing at which the sign information is drawn, and a location in a display screen on which the sign information is drawn.

23. A gaming machine comprising:

a touch panel that accepts inputs indicating a plurality of points from a player;

a positional information certifying unit that outputs positional information based on the inputs indicating the plurality of points accepted by the touch panel;

a sign information generating unit that generates sign information which is drawn based on the positional information depending on the plurality of points, outputted from the positional information certifying unit;

a sign data storage device that stores a plurality of sign data which are correlated with a plurality of predetermined gaming processes, respectively;

a comparing and discriminating unit that makes comparison between the sign information, generated by the sign information generating unit, and the sign data, stored in the sign data storage device, and discriminates whether or not the sign information and the sign data are correlated with each other; and a gaming processing unit that executes a predetermined gaming process, correlated with the correlated sign data among the plurality of predetermined gaming processes, according to the sign information which is drawn by sequentially connecting the plurality of points, under a condition where the comparing and discriminating unit discriminates that the sign information and the sign data are correlated with each other, wherein the comparing and discriminating unit discriminates whether or not a shape determined by the sign information and a shape determined by the sign data are correlated with each other when discriminating whether or not the sign information and the sign data are correlated with each other, and wherein the sign information and the sign data which present in a mirror-image relationship or a similarity relationship are correlated with each other.

* * * * *